W. A. SMITH.
BUTTON SEWING MACHINE.
APPLICATION FILED JUNE 1, 1915.

1,289,290.

Patented Dec. 31, 1918.
15 SHEETS—SHEET 1.

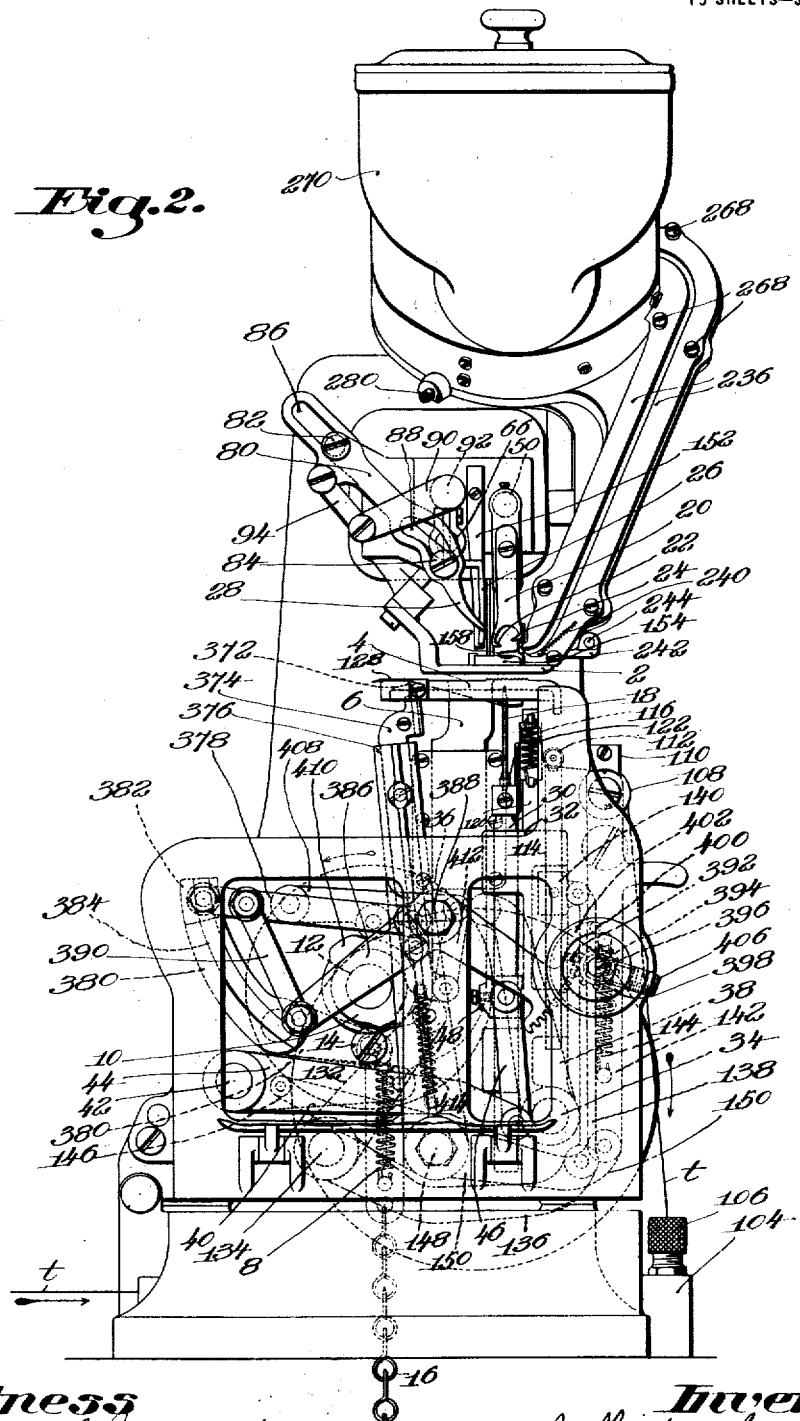

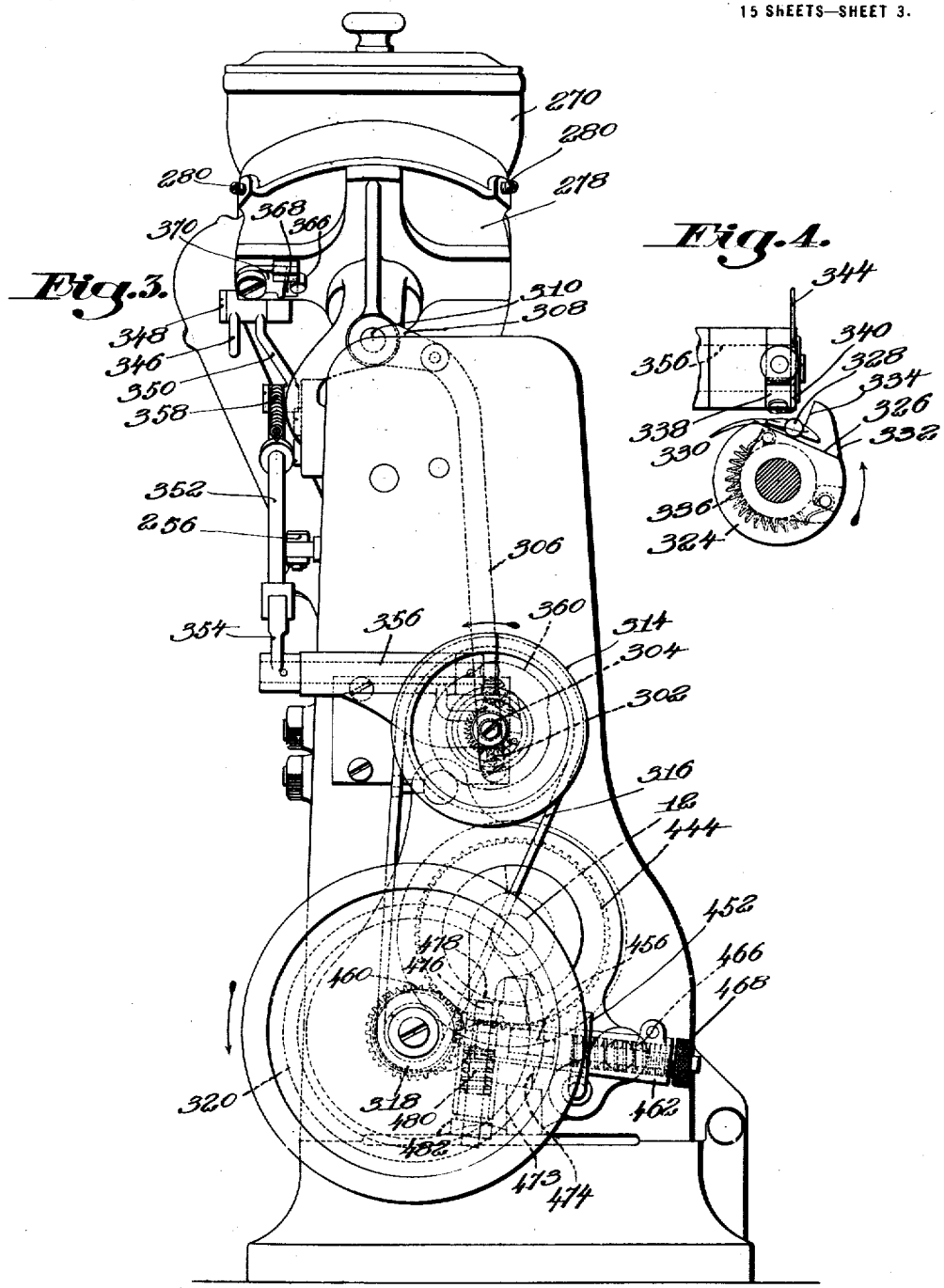

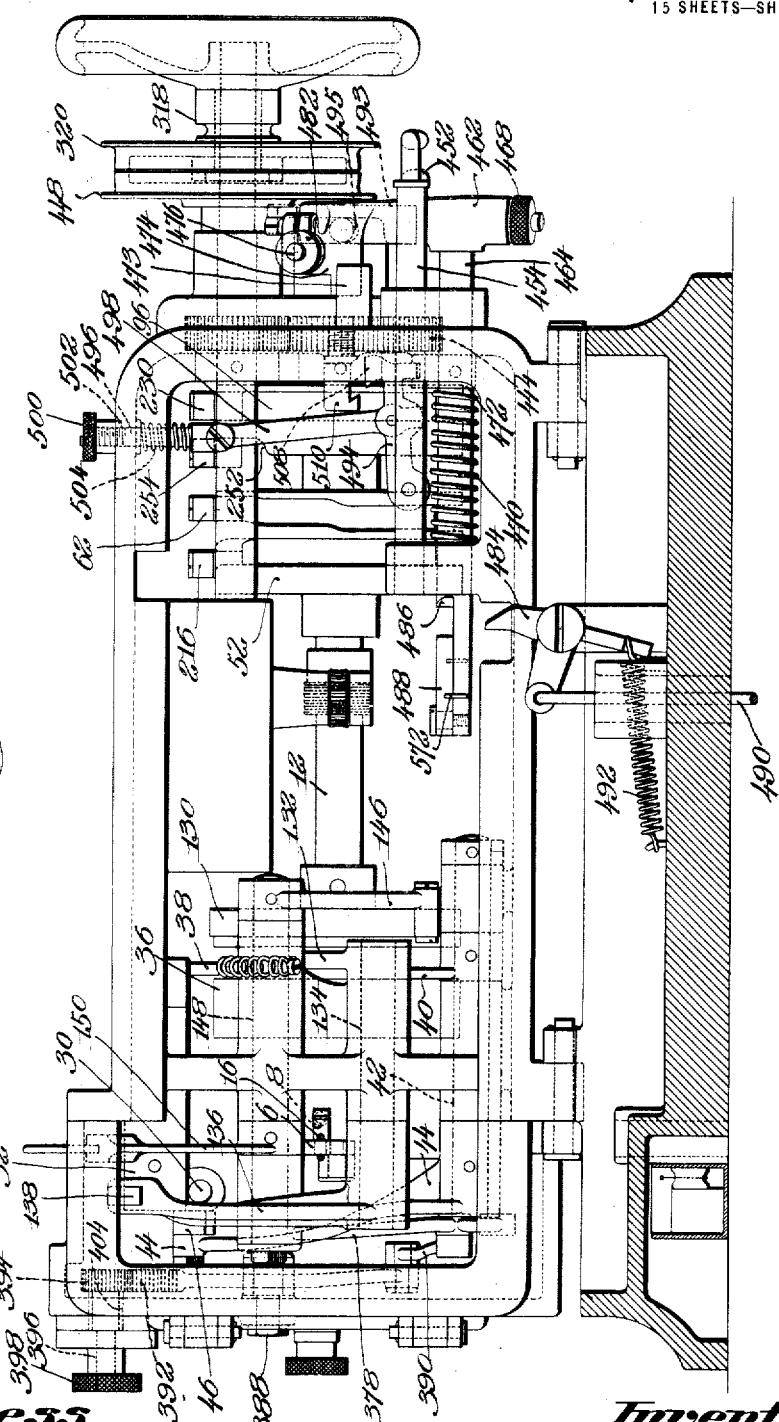

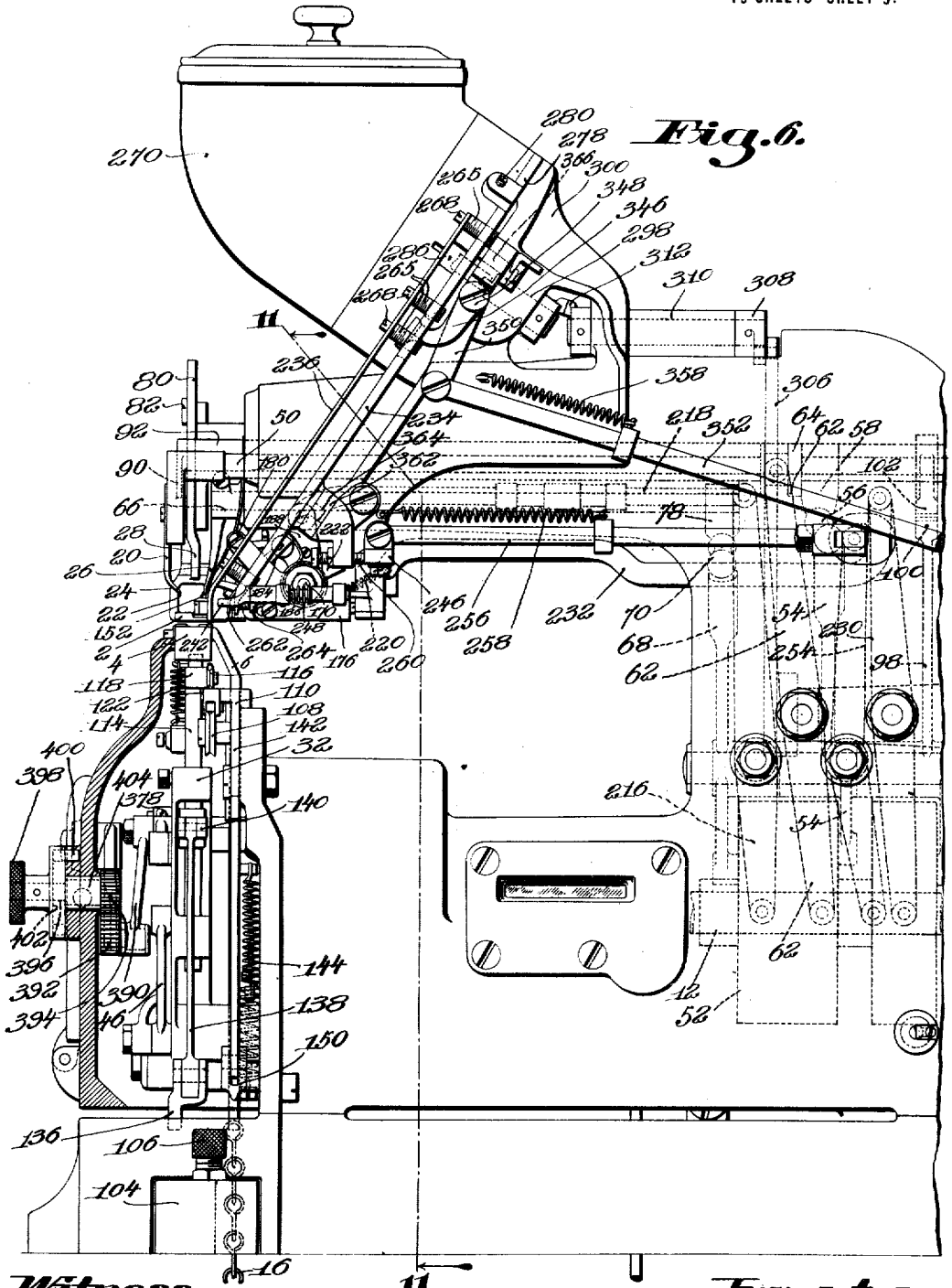

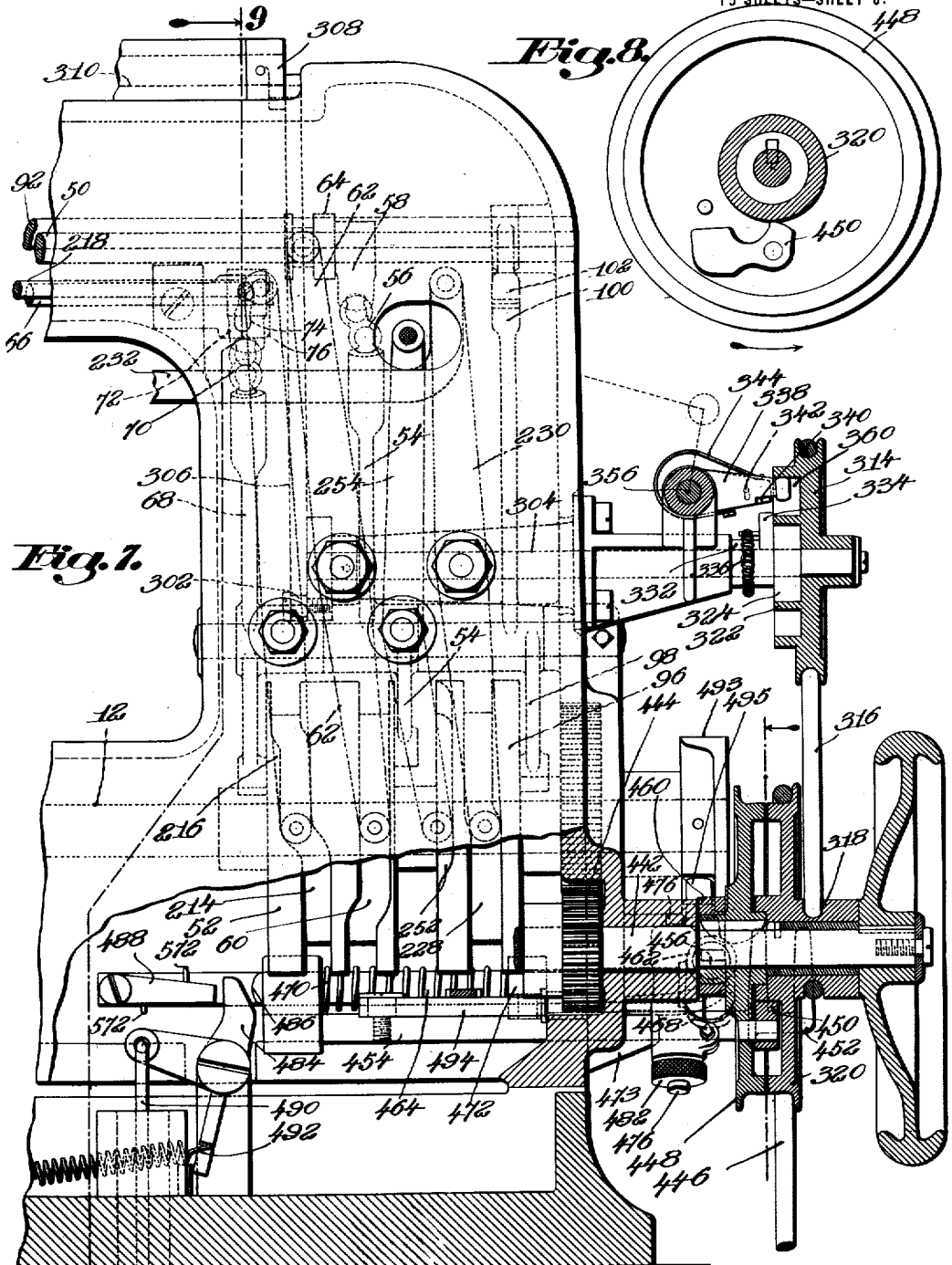

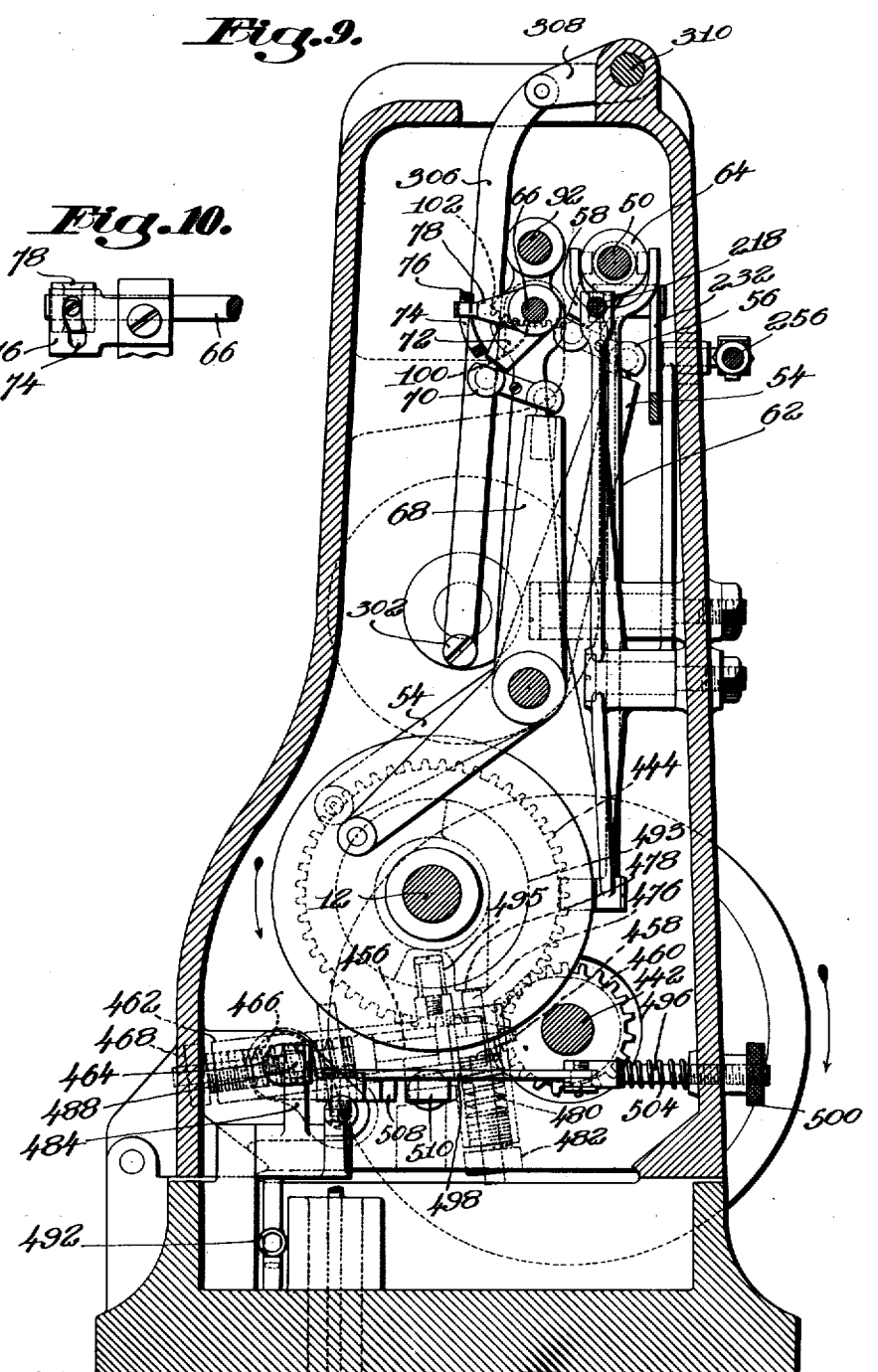

W. A. SMITH.
BUTTON SEWING MACHINE.
APPLICATION FILED JUNE 1, 1915.

1,289,290.

Patented Dec. 31, 1918.
15 SHEETS—SHEET 8.

Witness
Frederick S. Greenleaf.

Inventor
Willard A. Smith
Phillips Van Everen & Fish
Attys

W. A. SMITH.
BUTTON SEWING MACHINE.
APPLICATION FILED JUNE 1, 1915.

1,289,290.

Patented Dec. 31, 1918.
15 SHEETS—SHEET 9.

Witness
Frederick S. Greenleaf

Inventor
Willard A. Smith
by Phillips Van Every & Fish
Attys.

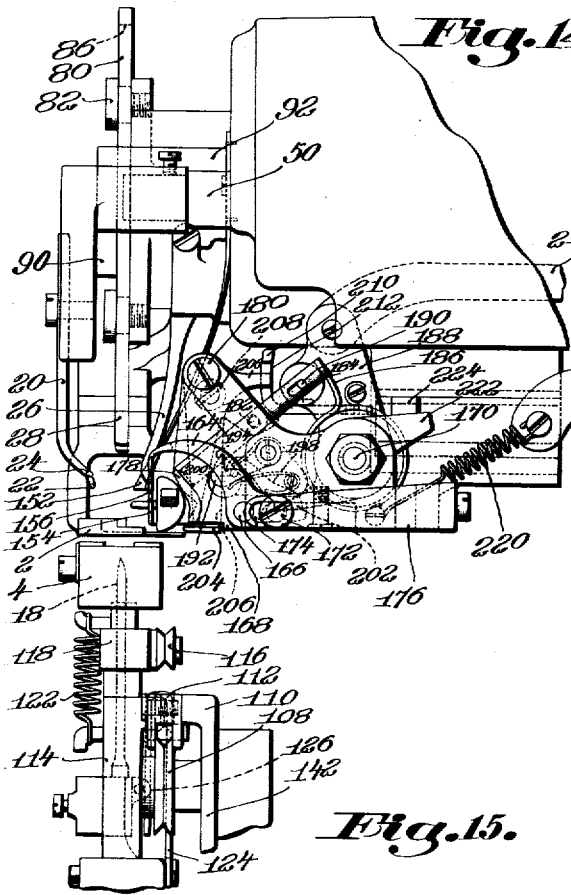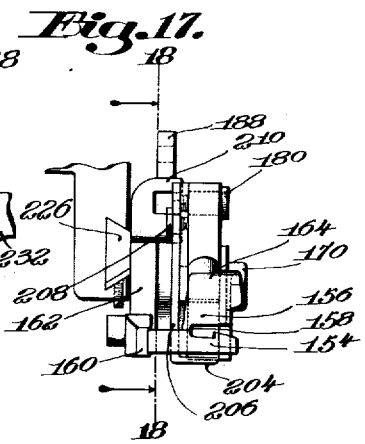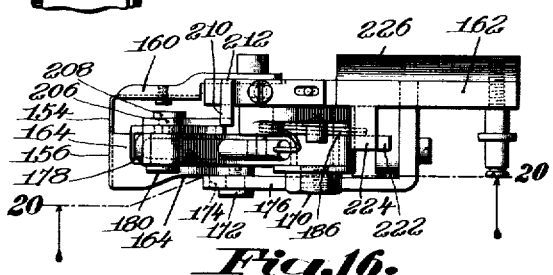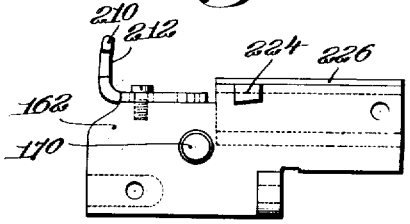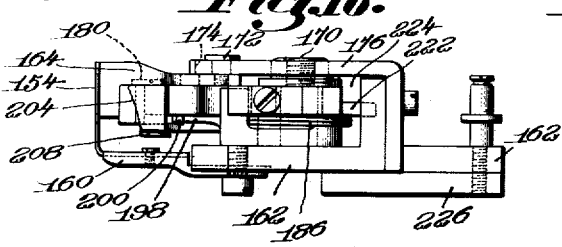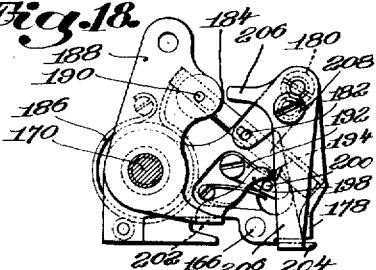

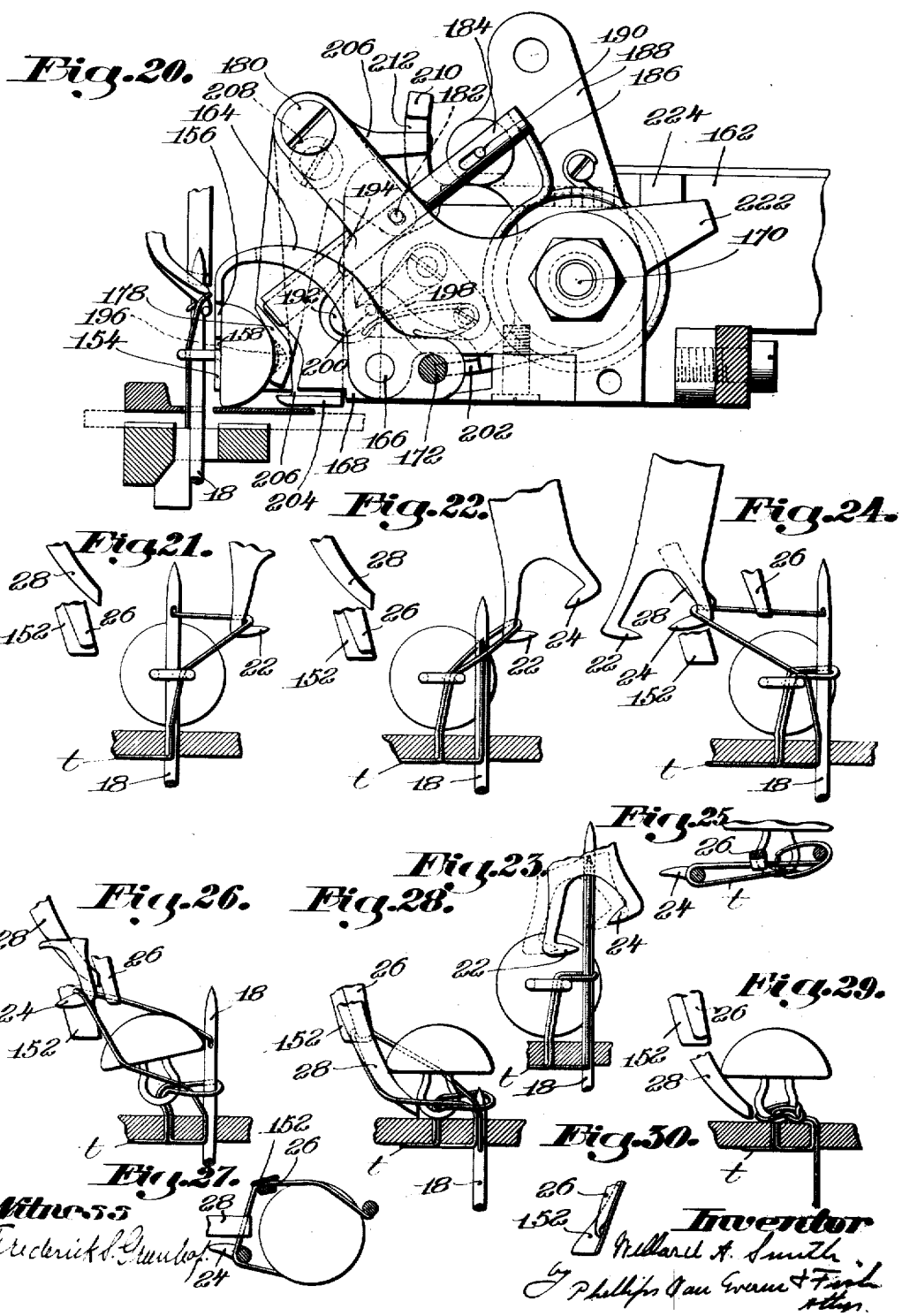

W. A. SMITH.
BUTTON SEWING MACHINE.
APPLICATION FILED JUNE 1, 1915.
1,289,290.
Patented Dec. 31, 1918.
15 SHEETS—SHEET 12.
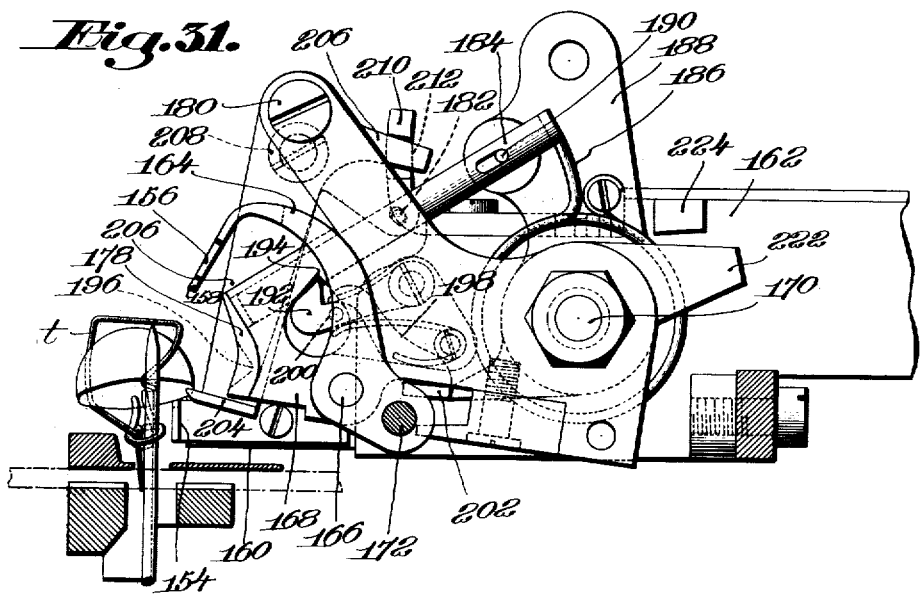
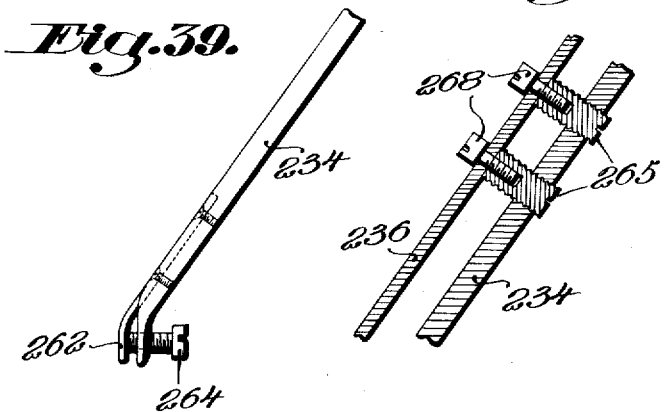

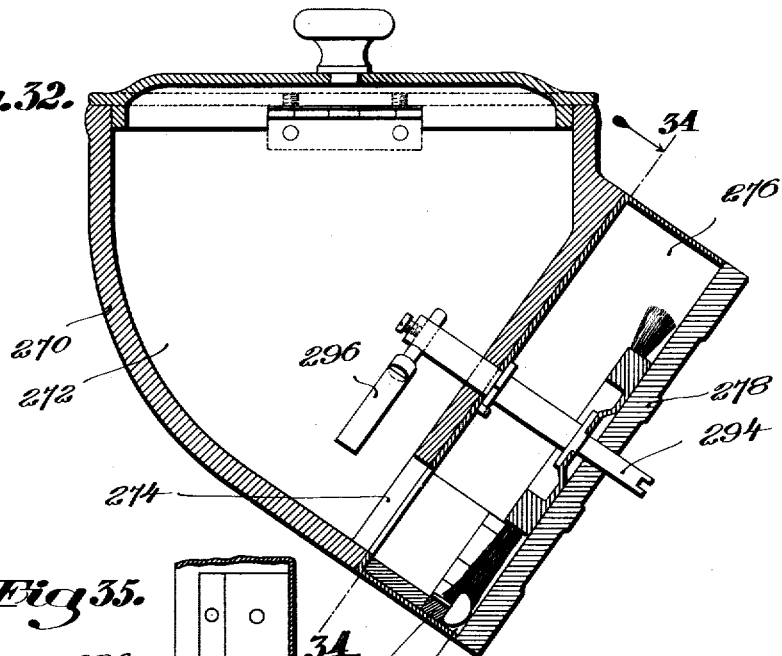
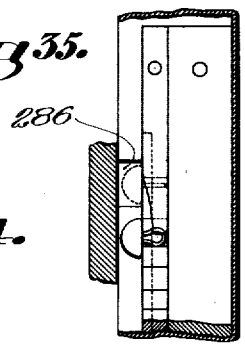
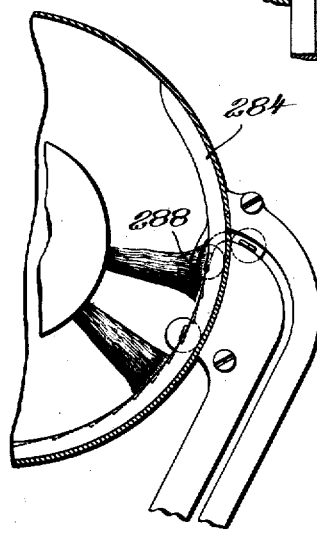
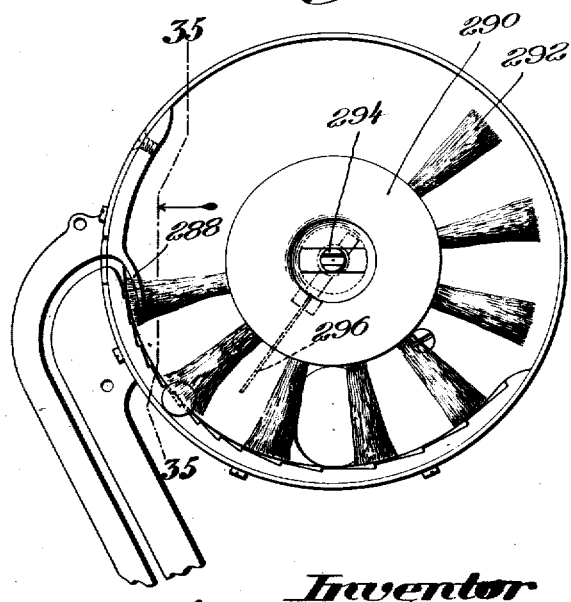

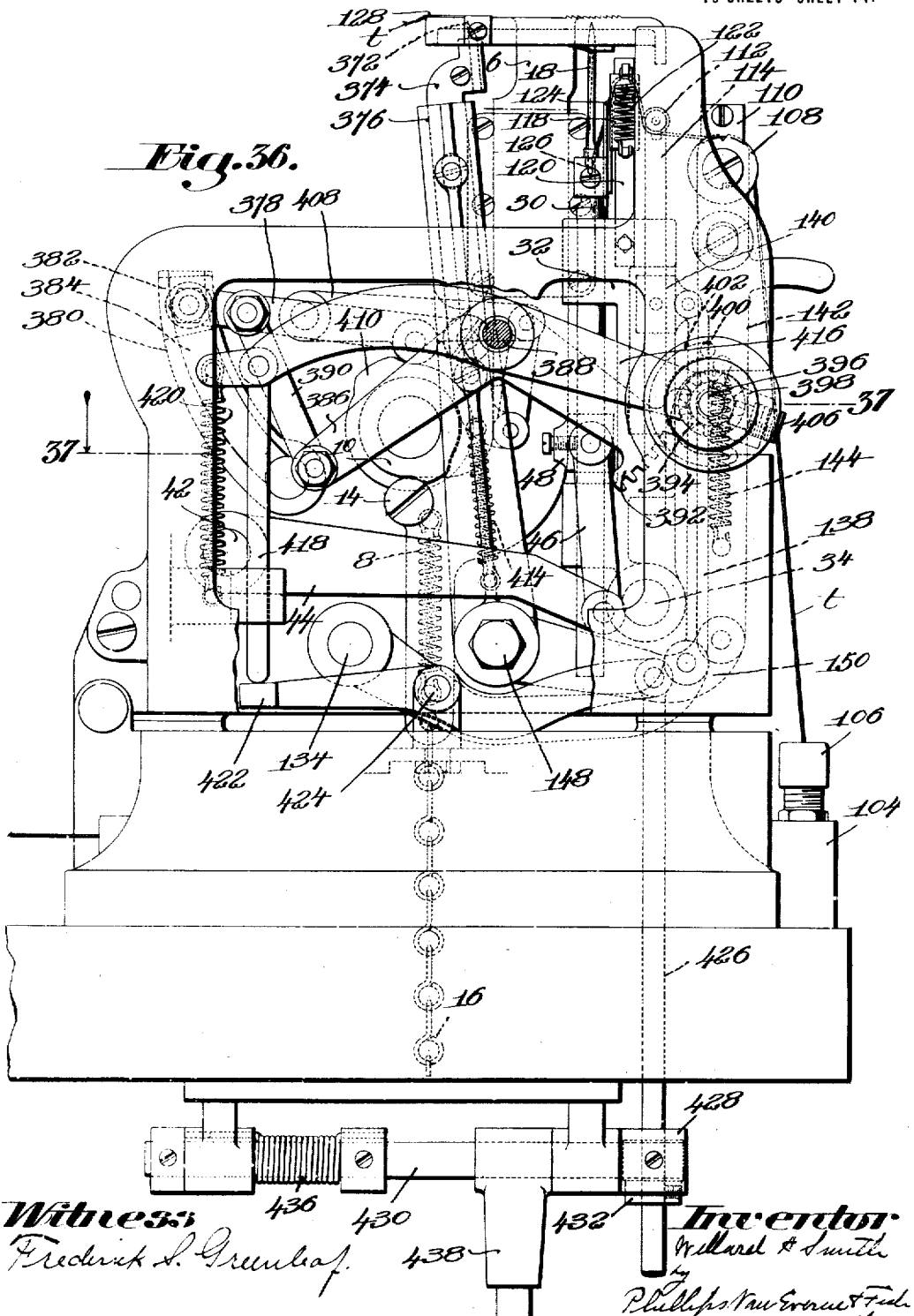

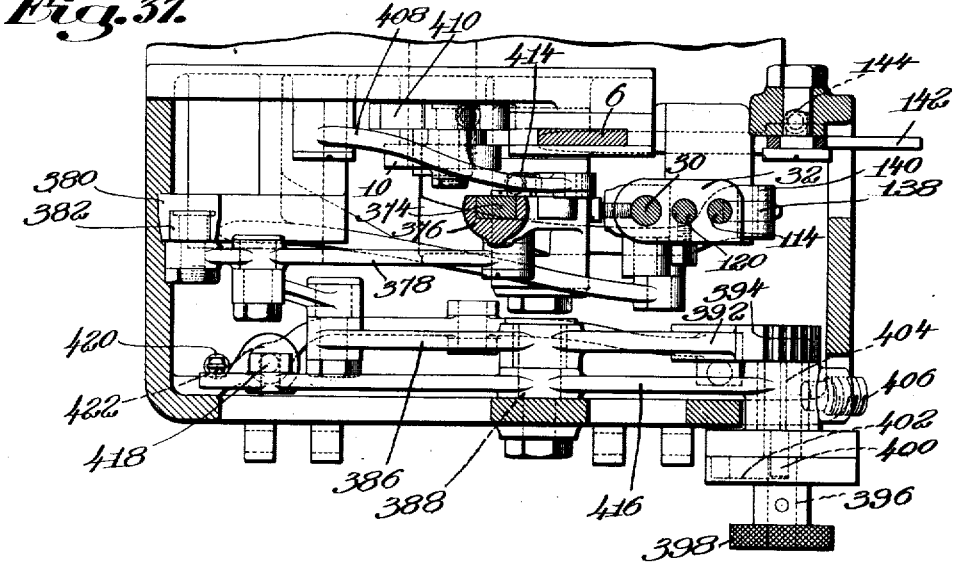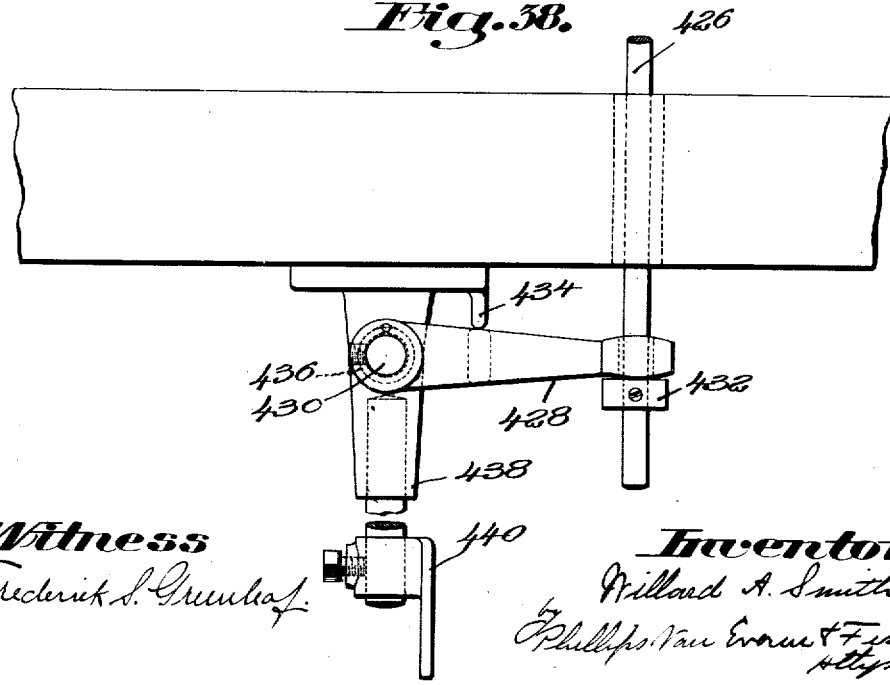

UNITED STATES PATENT OFFICE.

WILLARD A. SMITH, OF MELROSE, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY.

BUTTON-SEWING MACHINE.

1,289,290.     Specification of Letters Patent.     Patented Dec. 31, 1918.

Application filed June 1, 1915. Serial No. 31,459.

*To all whom it may concern:*

Be it known that I, WILLARD A. SMITH, a citizen of the United States, residing at Melrose, in the county of Middlesex and State of Massachusetts, have invented certain new and useful Improvements in Button-Sewing Machines; and I do hereby declare the following to be a full, clear, and exact description of the invention, such as will enable others skilled in the art to which it appertains to make and use the same.

The invention relates to machines for sewing shank eyed buttons to shoe uppers or other articles to which it may be desired to attach the same.

The object of the invention is to provide novel and improved stitch forming mechanism whereby the button securing loops may be formed and drawn to proper button securing position at high speed and in a uniformly reliable manner; to provide novel and improved mechanism for presenting the buttons in attaching position and for manipulating them during the operation of the attaching mechanism; and to otherwise improve and simplify the various parts and mechanisms of the machine whereby its operation is rendered more certain and reliable.

To these ends the invention comprises the features of construction and the combinations of parts hereinafter described and set forth in the claims, the advantages of which will be apparent to those skilled in the art from the following detailed description of the machine embodying the preferred form of the invention.

Figure 1:
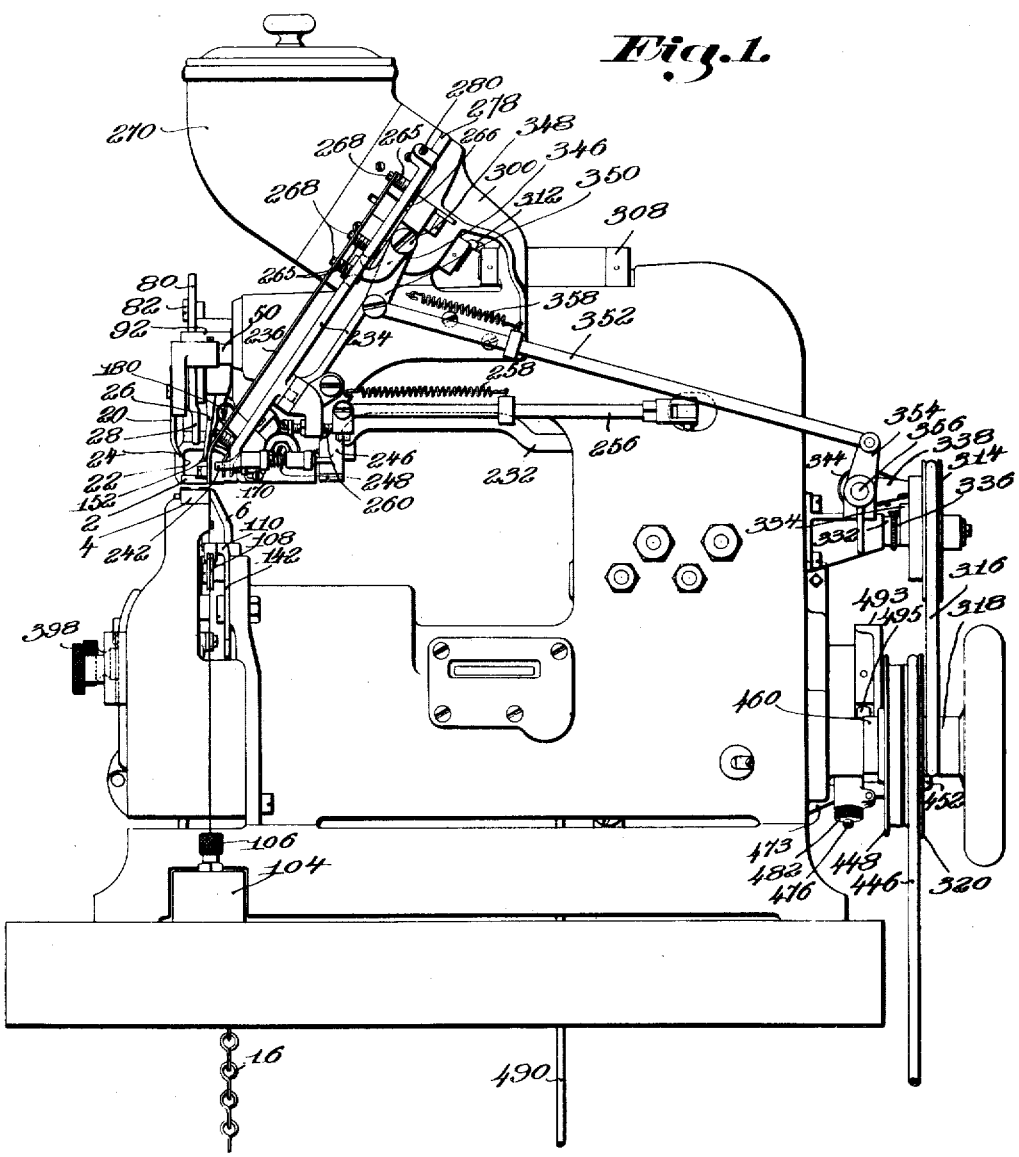
Figure 11:
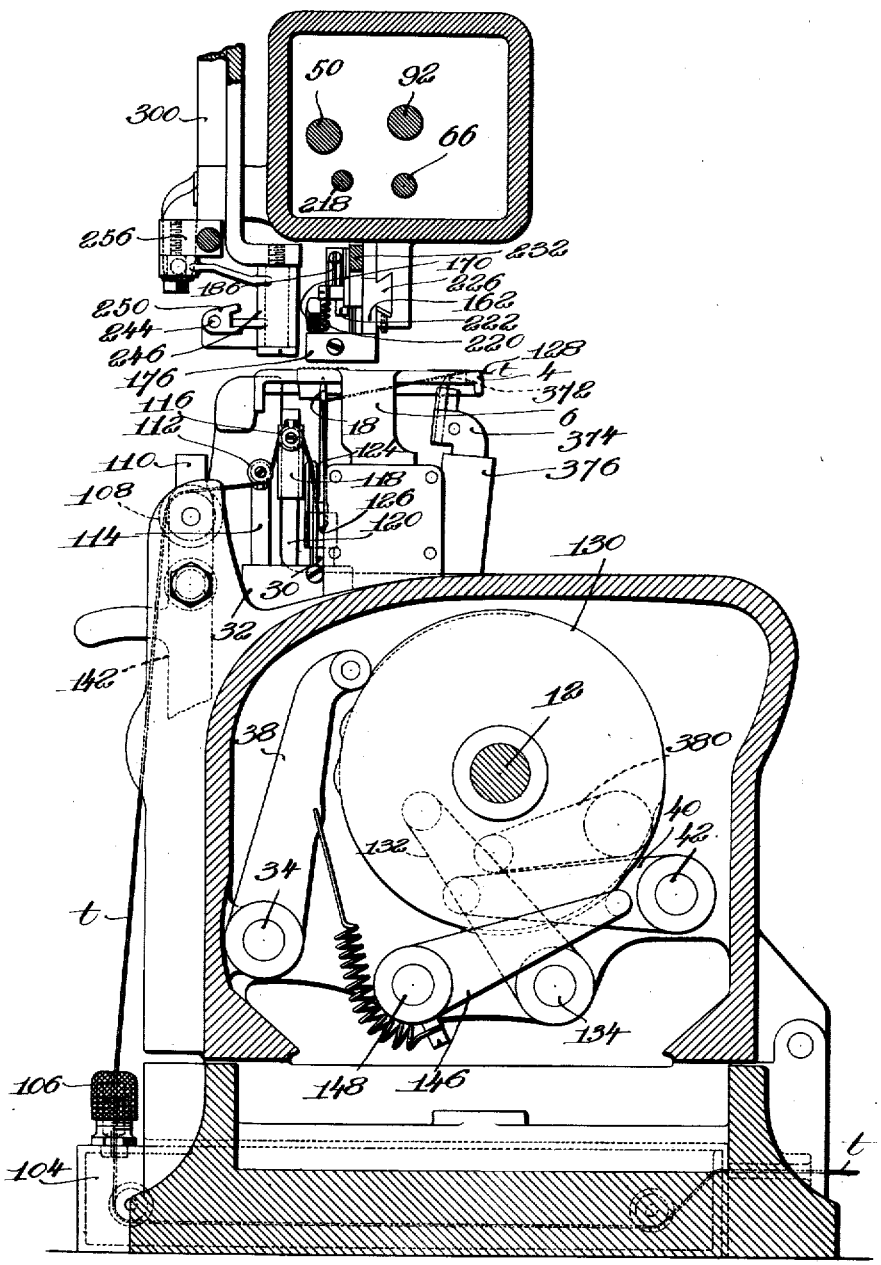
Figure 12:
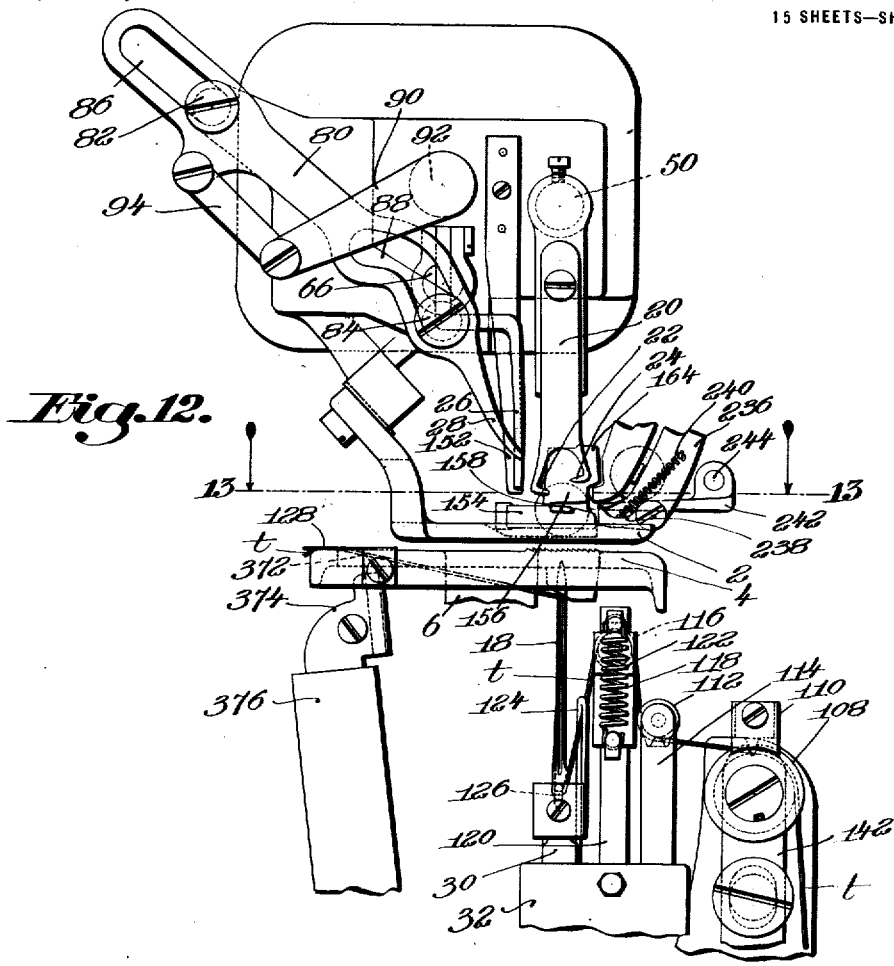
Figure 13:
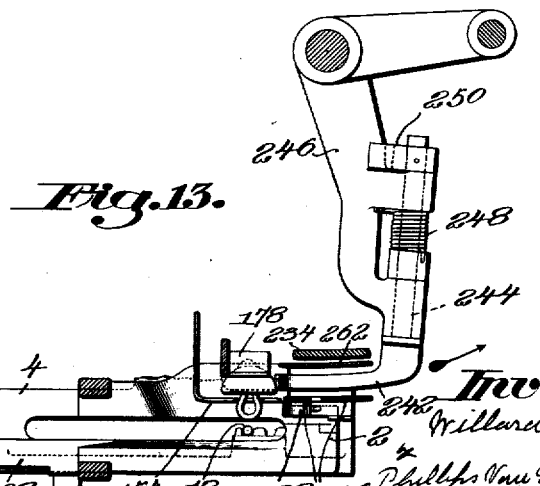

In the drawings, Figure 1 is a front elevation of a machine embodying the various features of the invention in their preferred forms; Fig. 2 is an end elevation looking toward the right in Fig. 1; Fig. 3 is an end elevation looking toward the left in Fig. 1; Fig. 4 is a detailed view of the clutch for controlling the supply of buttons to the button chute; Fig. 5 is a bottom view, the machine casing being swung about its pivots to bring the bottom of the machine into a vertical plane; Fig. 6 is a front elevation, partly in section, of the left-hand end of the machine; Fig. 7 is a front elevation, partly in section, of the right-hand end of the machine; Fig. 8 is a detail of the driving mechanism; Fig. 9 is a vertical sectional view on line 9—9, Fig. 7, looking toward the right; Fig. 10 is a detail of a loop spreader operating mechanism; Fig. 11 is a vertical sectional view taken substantially on the line 11—11 of Fig. 6; Fig. 12 is a detailed end elevation showing the thread handling devices; Fig. 13 is a sectional plan view on line 13—13, Fig. 12; Fig. 14 is a detail front elevation showing the button carrying and positioning devices; Fig. 15 is a plan view of the button carrier and parts mounted thereon; Fig. 16 is a bottom view of the same; Fig. 17 is an end elevation looking toward the right in Fig. 14; Fig. 18 is a sectional side elevation on line 18—18, Fig. 17, looking in the direction of the arrows; Fig. 19 is a side elevation of the button carrier slide; Fig. 20 is a sectional side elevation on an enlarged scale taken on line 20—20, Fig. 15; Figs. 21 to 30 are detailed views showing the mode of operation of the thread handling devices; Fig. 31 is a view similar to Fig. 20, showing the parts in a different position; Fig. 32 is a vertical sectional view through the button hopper; Fig. 33 is a bottom view of the lower chamber of the hopper, the base plate and the bottom plate of the button chute being removed to show the interior of the chamber; Fig. 34 is a sectional view on line 34—34, Fig. 32; Fig. 35 is a sectional view on line 35—35, Fig. 33; Fig. 36 is a partial front elevation, similar to Fig. 2, showing a modified form of work feeding mechanism on a somewhat larger scale; Fig. 37 is a sectional view on line 37—37, Fig. 36; Fig. 38 is a detail of a part of the mechanism for varying the feed during the operation of the machine; and Figs. 39 and 40 are details.

In the drawings the invention is shown as embodied in a machine in which the buttons are attached by passing a primary loop of thread through the work and through the button eye, then passing a secondary loop through the work outside the button eye and through the primary loop, then passing the secondary loop over the button, and finally tightening the knot thus formed. In this machine the work is clamped, during the operation of the button attaching mechanism, between the under face of a fixed throat plate 2 and the upper face of a vertically reciprocating presser foot 4, the throat plate and presser foot being slotted in the line of feed in the usual manner. The presser foot is formed on the upper end of a vertically movable slide 6 which is forced in a direction to clamp the work by a spring 8, and which is withdrawn between successive button attaching operations by a cam 10 secured to the cam shaft 12 and engaging a roll 14 on the slide. The lower end of the slide 6 is connected by a chain 16 with a treadle by which the presser foot may be withdrawn to enable the work to be inserted or removed.

As shown, the button attaching mechanism comprises a vertically reciprocating eye-pointed needle 18 for carrying the primary loop through the work and through the button eye, and for carrying the secondary loop through the work outside of the button eye and through the primary loop, a looper 20 provided with a loop taking finger 22 for taking the primary loop and holding it in position for the passage of the secondary loop therethrough, and with a second loop taking finger 24 for subsequently taking the secondary loop and carrying it into position to be passed over the head of the button, a loop spreader 26 for coöperating with the looper in spreading the secondary loop so that it will pass over the button, and a loop guiding plunger 28 for directing the secondary loop down under the button shank.

The needle 18 is secured in the upper end of a needle bar 30 mounted to reciprocate in guides formed in a carrier 32 which is secured to the forward end of a rock shaft 34. The rock shaft is rocked to vary the path of reciprocation of the needle in carrying the primary and secondary loops through the material by a cam formed on the periphery of the cam shaft 12 and engaging an arm 38 secured to the rear end of the rock shaft (Figs. 2 and 5). The needle bar is reciprocated by a cam groove formed in the face of the disk 36 and engaging a roll on the end of an arm 40 secured to a rock shaft 42 which also carries an arm 44 the end of which is connected by a link 46 with a collar 48 secured to the needle bar (Figs. 2, 5, 11 and 36).

The loop taking fingers 22 and 24 project in opposite directions from the end of the looper arm 20, and the arm is given a simple reciprocation to move the loop taking fingers in paths substantially parallel to the face of the work across the path of reciprocation of the needle, the finger 22 taking the primary loop as the looper arm moves toward the right, and the looper finger 24 taking the secondary loop as the looper arm moves toward the left. The loop taking fingers preferably project toward each other, and are arranged one slightly above the other as shown, although this arrangement of the fingers is not essential. The looper arm may be mounted in any suitable manner so that it may reciprocate as described, and is preferably mounted upon a horizontal shaft 50 arranged above the throat plate and mounted to oscillate to carry the looper fingers across the path of reciprocation of the needle, and also mounted to move axially so that the loop taking finger 22 may carry the primary loop laterally into position for the passage of the needle and secondary loop therethrough, and so that the loop taking finger 24 may carry the secondary loop laterally into proper position to be passed over the button. As shown, the looper carrying shaft 50 is rocked at the proper intervals by a cam groove formed in a cam drum 52 secured to the cam shaft 12, and engaging a roll carried by the lower end of a lever 54, the upper end of which is connected by a link 56 with an arm 58 secured to the shaft 50 (Figs. 6, 7 and 9). The shaft 50 is moved axially at proper intervals by a cam groove 60 formed in the periphery of the cam drum 52, and engaging a roll on the lower end of a lever 62, the upper end of which carries rolls engaging an annular groove in a collar 64 secured to the shaft 50.

The loop spreader 26 is in the form of a loop engaging finger depending from the front end of a horizontal shaft 66 arranged above the throat plate. The shaft is mounted to rock so that the finger may properly enter the secondary loop, and to move axially to spread the loop laterally into position to pass over the button. As shown, the shaft 66 is rocked at proper intervals by a cam groove formed in the front face of the cam drum 52 and engaging a roll on the lower end of a lever 68, the upper end of which is connected by a link 70 with an arm 72 secured to the rear end of the shaft. As the spreader shaft is rocked it is moved axially by a cam groove 74 formed in a stationary plate 76 and engaged by a roll carried on the end of an arm 78 secured to the shaft.

The loop guiding plunger 28 is formed on the lower end of a rocking and sliding bar 80 which is supported above the throat plate. As shown, the bar 80 is mounted to slide on two supporting screws 82 and 84, the screw 82 engaging a straight slot 86 in the upper end of the bar, while the screw 84 engages a curved cam slot 88 near the lower end of the bar. As the bar is reciprocated the slots act to give the loop guiding lower end 28 the proper movement to enter the spread secondary loop and then pass down and under the shank of the button. The bar 80 is advanced and retracted at proper intervals by an arm 90 secured to the outer end of a rock shaft 92 and connected by a link 94 with the bar. The rock shaft is operated by a cam groove formed in the inner face of a cam drum 96 secured to the cam shaft 12, and engaging a roll on the lower end of a lever 98, the upper end of which is provided with a gear segment 100 engaging a gear segment 102 secured to the rock shaft.

The button attaching thread $t$ is led from the thread supply through a wax pot 104 (Fig. 11), through a stripper guide 106, over a guide roll 108 which is mounted upon a fixed pivot and is arranged to coöperate with a thread clamping device 110. From the guide roll 108 the thread leads under a take-up roll 112 carried by a vertically reciprocating bar 114 mounted in the needle bar carrier and operated at suitable intervals to take up or deliver the thread. From the takeup roll the thread leads over a roll 116 carried by a sleeve 118 which is free to slide on a rod 120 secured in the needle bar carrier. The sleeve is supported by a spring 122, the upper end of which is connected to a pin projecting from the rod 120, and the lower end of which is connected to a pin projecting from the lower end of the roll carrying sleeve, so that the roll may yield when sufficient tension is put upon the thread, and will thus act as an auxiliary spring takeup or slack thread controller. The thread leads from the auxiliary takeup roll through a thread guide 124 secured to the needle bar carrier, and thence through a thread guide 126 on the upper end of the needle bar, from which it leads to the eye of the needle. When the machine is idle, the free end of the thread leads from the eye of the needle to a spring thread holder or clip 128 secured to the presser foot. The bar 114 carrying the takeup roll 112 is operated by a cam groove formed in the face of a cam disk 130, and engaging a roll on the end of an arm 132 which is secured to the rear end of a rock shaft 134, the forward end of which carries an arm 136 connected by a link 138 with a collar 140 secured to the bar (Figs. 2, 5, 11 and 36). The thread clamp 110 is secured to the upper end of a vertically sliding bar 142 which is moved in a direction to clamp the thread by a spring 144, and is moved at proper intervals to release the thread by a cam formed on the periphery of the cam drum 130, and engaging a roll on the end of an arm 146 secured to the rear end of a rock shaft 148, to which is also secured an arm 150 the end of which is pivotally connected with the lower end of the bar.

The operation of the thread handling devices above described in securing the button to the work is as follows. During the first upward stroke of the needle the button is held with its shank in a substantially horizontal plane, and with the eye in register with the needle, so that the needle passes up through the work and through the button eye, as indicated in Fig. 21. During the first part of the upward movement of the needle, the thread is clamped by the thread clamp so that the thread is put under tension, and is drawn taut across the material from the previously attached button, the tension on the thread tending to further tighten the knot by which this button is attached. During this part of the first up-stroke of the needle, the auxiliary spring takeup will yield to avoid putting undue tension on the thread. After the needle has partially completed its upward stroke, the thread clamp is operated to release the thread, and during the latter part of its stroke the needle draws thread freely from the thread supply. As the needle starts down after completing its up-stroke the looper is swung toward the right, so that the primary loop taking finger 22 takes a loop from the needle and draws it in the line of the feed, as indicated in Fig. 21. The needle is then retracted, the primary loop being held by the looper finger, the needle carrier is moved to the right, and the needle is again advanced through the material, passing outside of the button eye, as indicated in Fig. 22. Meanwhile the looper has been moved laterally so that the primary loop held by the finger 22 is presented in such position that the needle passes through this loop. As the needle starts upward the second time the thread is again clamped, so that as the needle advances from the position indicated in Fig. 22 to the position indicated in Fig. 23 it will draw slack thread out of the primary loop, which, during this movement of the needle, is given up by the movement of the looper toward the left and into the position indicated in Fig. 23. The takeup also acts during this upward stroke of the needle to take up a part of the thread in the primary loop and to keep the thread taut. As the needle reaches the upper end of its stroke indicated in Fig. 23 the thread clamp releases the thread, so that the auxiliary takeup may return to its normal position where it does not exert a pull on the thread. The needle then starts downward, and since there is no tension on the thread, it opens a loop which is entered by the loop taking finger 24 as the looper swings from the full line position to the dotted line position of Fig. 23. The thread is then again clamped, and as the looper continues to swing toward the left, the loop taking finger 24 carries the secondary loop in the direction of the feed, the takeup rising to give up thread for the first part of the loop. After the takeup has moved above the position indicated in the drawings, and has given up all the thread held by it to the looper, the thread is unclamped, and the looper draws the latter part of the secondary loop from the thread supply. The position of the looper and needle as the looper completes its movement toward the left, is indicated in Figs. 24 and 25. The loop spreader 26 is then actuated to engage the loop, as indicated in Fig. 25, and as the spreader swings downward it is retracted to spread the loop horizontally, the looper being at the same time moved laterally in the opposite direction to assist in spreading the loop horizontally, as indicated in Figs. 26 and 27. At the same time the button is released by the devices which have been holding it, and is moved into position with its head substantially parallel to the work and partially through the spread secondary loop. As the needle continues to descend, the spreader carries the loop against a spring retaining finger 152 which coöperates with the spreader in holding the secondary loop in proper position to pass down over the head of the button. When the secondary loop has been spread and the button delivered into the position indicated in Fig. 26, the loop guiding plunger 28 is advanced so that it enters the loop and passes down under the head of the button and below the shank, as indicated in Fig. 28, the looper finger 24 swinging toward the right to release the loop. Now as the needle completes its downward stroke the thread is clamped and the takeup acts to draw the secondary loop down under the shank of the button, and to draw the interlocked loops tight, as indicated in Fig. 29, the spring retaining finger 152 yielding to allow the escape of the secondary loop, and the plunger 28 guiding the secondary loop down under the shank of the button so that it will lie close to the surface of the work, thus enabling the knot to be effectively tightened. After the button has been thus attached the thread clamp releases the thread so that it may draw from the thread supply during the feed of the work, or during the movement of the work in removing it from the machine.

The button is presented in attaching position by a vertical positioning plate 154 which during the first upward stroke of the needle stands at the right of the needle path, and against the rear face of which the under surface of the button head is held, so that the shank projects over the upper edge of the plate and lies in a horizontal plane with the eye in register with the needle. Coöperating with the positioning plate 154 is an upper plate 156 arranged to engage the under surface of the button head above the shank, and arranged with relation to the lower plate to leave a shank receiving slot through which the button shank may pass in feeding the buttons into position on the positioning plate. The upper edge of the lower plate 154 is preferably recessed to form a shank positioning notch, and the upper plate 156 is preferably provided with a shoulder 158 which forms a stop at the end of the shank receiving slot for arresting the movement of the button when its shank is properly positioned to enter the shank positioning recess or notch.

The lower plate 154 is secured upon a block 160 which is in turn secured in fixed position upon a support 162, (Figs. 12 to 20, and 31). The upper plate is formed on the forward end of a lever 164 which is pivotally supported so that the plate may be swung up to allow the button to be discharged over the upper edge of the lower plate 154, preparatory to passing the secondary loop over the head of the button. As shown, the lever 164 is pivoted at 166 on a block 168 which is mounted to turn about a stud 170 projecting from the support 162. The rear end of the lever carries a pin 172 which plays in a slot 174 formed in a plate 176 secured to the support 162, so that the plate 156 will be swung rapidly up away from the plate 154 when the block 168 is turned from the position of Fig. 20 to that of Fig. 31. The button is held in position against the rear faces of the plates 154 and 156 by a clamping plate 178 formed on the lower end of one arm of a bell crank lever which is pivoted at 180 to a projecting arm on the block 168. The other arm of the bell crank lever is provided with a slot engaged by a pin 182 projecting from a slide bar 184 which is mounted to slide in a bearing in the block 168. The slide bar is forced in a direction to move the clamping plate 178 into clamping engagement with the button by a spring 186, and is retracted against the tension of the spring to unclamp the button by a lever 188 mounted on the stud 170 and provided with a pin 190 engaging a slot in the bar. When the bar is retracted to unclamp the button, the bar and clamp are held in retracted position by a spring pressed latch 192 pivoted in a recess in the side of the block 168, and having a hooked end arranged to engage a notch 194 in the slide bar. The clamping plate is provided with a central conical recess 196, so that it will act to center and properly clamp buttons having heads of varying size and shape. The latch 192 is operated to release the button clamp by an arm 198 projecting from the lever 188 and arranged to overlie the pin 200 projecting from the latch. The lever 188 is also provided with a projection 202 arranged to engage the under side of the block 168, and to swing the block up about the stud 170 when the button is to be released and discharged from the plate 154. The means for discharging the button over the plate 154 comprises a lifting or discharging plate 204 formed on the lower end of a lever 206 which is pivoted at 208 to the side of the button clamp lever. The lever 206 is provided with a rearwardly projecting arm which, during the upward movement of the block 168 engages a lateral projection 210 formed on an arm 212 secured to the support 162, and swings the lever about its pivot from the position of Fig. 20 to the position of Fig. 31. The lever 188 is operated by a cam groove 214 formed in the cam drum 52, and engaging a roll on the lower end of a lever 216, the upper end of which is connected by an adjustable link 218 with the upper end of the lever 188 (Figs. 6 and 7).

When the button is fed into position back of the positioning plates 154 and 156, with its shank projecting through the shank receiving slot between the plates, the parts are in the position indicated in Fig. 14, with the button clamp held in retracted position by the latch 192, and with the block 168 held in its lower normal position by a spring 220 which holds the stop lug 222 on the block firmly against a stop lug 224 on the support 162. After the button has been fed into position, the lever 188 is moved forward into the position indicated in Fig. 20, thus disengaging the retaining latch 192, so that the spring 186, acting through the slide bar 184, forces the clamping plate against the head of the button, so that the under face of the button head is held firmly against the plates 154 and 156. When the button is to be released and discharged, the lever 188 is retracted and during the first part of this movement the pin 190 retracts the slide bar 184, thus disengaging the clamp from the button head and bringing the notch 194 in the bar into position to be engaged by the latch 192. During the continued movement of the lever 188 the projection 202 engages the block 168 and swings the block up into the position indicated in Fig. 31. During the first part of this movement of the block the upper plate 156 is swung up away from the plate 154, and then the bell crank lever 206 engages the projection 210, so that the discharging plate is swung forward and upward, and lifts the button over the plate 154, as indicated in Fig. 31. Before the succeeding button is fed into position back of the plate 154, the lever 188 is advanced sufficiently to allow the spring 220 to return the parts to the position indicated in Fig. 14, preparatory to clamping and positioning this button.

The buttons are fed into position back of the positioning plates 154 and 156 from the lower end of a button chute, and it is preferred to arrange this chute a short distance to one side of the line of feed, and to construct the support 162 to slide transversely of the line of feed, so that the button positioning and clamping plates, and the other parts mounted upon the support, form a carrier for receiving the buttons from the lower end of the chute and carrying them transversely of the line of feed into attaching position. By this construction and arrangement of feed chute and button carrier the operator is given a clear and unobstructed view of the work along the line of feed, and is enabled to more easily and accurately position and guide the work in attaching a series of buttons.

In the construction shown the support 162 is provided on its rear side with a dove-tail rib 226 guided in a correspondingly shaped guideway in a fixed part of the machine frame. The supporting slide is reciprocated in the guideway by a cam groove 228 formed in the cam drum 96, and engaging a roll at the lower end of a lever 230, the upper end of which is connected by a link 232 with the slide (Figs. 6, 7 and 9).

The button chute, from the lower end of which the buttons are delivered to the button carrier, comprises a back plate 234 for supporting the heads of the buttons, and two front plates 236 which are spaced to leave a shank guiding slot between them. The chute is arranged in an inclined position, so that the buttons will be fed down the chute by gravity, and the front plates are so shaped that the shank guiding slot curves at the exit end of the chute to present the shanks of the buttons in approximately a horizontal position, and in line with the shank receiving slot between the positioning plates 154 and 156, when the button carrier is in register with the end of the chute (Figs. 1, 2, 6, 12 and 13). The button chute is provided at its lower end with a yielding stop for retaining the lowermost button in the chute. This stop as shown is in the form of a finger 238 pivoted to one of the front plates, and held normally in position with its free end projecting across the shank slot by a spring 240. The stop is thus in position to engage the shanks of the buttons, and not only acts as a stop, but also tends to swing the button heads against the positioning plates as the buttons are fed from the end of the chute into position back of the plates. The buttons are fed or delivered from the lower end of the chute into position back of the positioning plates on the button carrier by a reciprocating feeding finger 242 arranged to pass through the lower end of the chute, and to push the lowermost button past the yielding stop 238 and into position with its shank against the shank stop 158 on the button carrier. The feeding finger, as shown, is formed on the front end of a rock shaft 244 pivoted in a feed lever 246, and held in normal position on the lever by a spring 248. The rock shaft 244 is provided with a collar 250 notched to embrace the lever 246 and to permit the feeding finger to yield downwardly to a limited extent (Figs.

11 and 13). By thus yieldingly mounting the feeding finger it is adapted to operate properly upon buttons of various sizes, since if the buttons are of such a size that the finger strikes the lower edge of the second button, it will yield and swing down under this button into position to act properly upon the first or lower button in the chute. The feed lever is retracted by a cam 252 formed on the face of the cam drum 96 and arranged to engage a roll on the lower end of a lever 254, the upper end of which is connected by a link 256 with the feed lever (Figs. 1, 6, 7, 9 and 11). The lever is advanced to effect the feeding of the button by a spring 258, one end of which is connected to a collar on the link 256, and the other to a fixed point on the machine frame. The forward movement of the feeding finger is determined by an adjustable stop screw 260 arranged to be engaged by the end of the feed lever 246.

In order that the chute may be readily adjusted to position the buttons at the lower or delivery end of the chute, with the under sides of the heads close to the front plates, and to enable the same chute to be used for delivering buttons of various sizes, an auxiliary plate 262 is provided at the lower end of the back plate, which may be adjusted toward and from the front plates in accordance with the size or shape of the buttons being operated upon. As shown, this auxiliary plate is in the form of a spring metal strip or plate, the upper end of which is secured in a slot or groove in the back plate, so that this end of the auxiliary plate is flush with and forms a continuation of the back plate, and the lower end of which is arranged to be engaged by an adjusting screw 264 which may be readily manipulated to properly adjust the end of the auxiliary plate which lies directly back of the delivery end of the front plates (Figs. 6 and 39).

In order that the front plates may be readily and conveniently positioned in proper relation to the back plate, they are connected with the back plate by screw threaded studs 265 which pass through the back plate, and are provided on their lower ends with slots to enable them to be readily adjusted. The front plates are secured upon the upper ends of the screw studs by screws 268 which pass through holes in the front plates and are screwed into the upper ends of the screw studs. These screws clamp the plates to the ends of the studs, and also serve to lock the studs in adjusted position (Figs. 1, 6 and 40).

Buttons are supplied to the upper end of the button chute from a hopper 270 provided with an upper chamber 272 into which the supply of buttons is placed, and from which they pass through an opening 274 into the lower separating chamber 276 of the hopper. The hopper chamber 276 is cylindrical, and its axis is inclined and at right angles to the plane of the back plate 234 of the button chute. The lower end wall 278 of the hopper chamber 276 is formed by an extension on the upper end of the back plate 234, and the cylindrical part of the hopper is removably secured to this plate by clamping screws 280 passing through lugs on the plate 278 and engaging the walls of the hopper.

The hopper chamber 276 is provided along the lower side of its end wall with a button head receiving groove 282, the lower side of which is formed by the upper surface of the end wall, and the upper side of which is formed by the lower surface of a segmental ring 284 secured along the inner surface of the cylindrical wall of the hopper. The inner surface of the ring 284 forms a ledge directly above the head receiving groove 282 for engaging and supporting the shanks of the buttons, the heads of which enter the groove. The shank supporting ledge is notched to form retaining teeth for engaging the shanks and retaining the buttons in position on the ledge as they are moved upward toward the delivery end of the ledge and slot. The teeth are preferably of varying lengths, as indicated in Fig. 33, although this is not essential. The upper end of the button slot and shank retaining ledge register with a button exhaust opening 286 in the cylindrical wall of the hopper. A shank guiding finger 288 projects from the inner wall of the hopper and parallel with the upper end of the shank ledge, so that it forms with the upper end of the ledge a shank guiding slot for directing the buttons through the exit opening in the wall of the hopper. The shank guiding slot between the finger 288 and the upper end of the shank guiding ledge registers with or forms a continuation of the shank guiding slot between the front plates of the button chute, so that the buttons which are carried by the shank guiding and retaining ledge pass from the hopper into the upper end of the chute, as indicated in Fig. 34. The means shown for moving or feeding the buttons upward along the ledge 284 consist of an oscillating disk 290 provided with a series of brushes 292 arranged to sweep along the button receiving slot and ledge and sweep the buttons which enter the groove up along the ledge, the teeth in the ledge preventing the return of the buttons when the brushes travel in the opposite direction. The disk 290 is secured upon a short shaft 294 mounted in the hopper and projecting through a hole in the plate 278. The upper end of the shaft also carries a button agitator 296 for acting upon the buttons in the receiving chamber 272. The lower end of the shaft 294 is provided with a slot adapted to receive a tongue on the upper end of a shaft 298 which is journaled in a bracket 300 on the machine frame. The slot and tongue form a readily detachable coupling for connecting the shafts 294 and 298. The means for oscillating the shaft 298 and connected brush disk comprises a crank 302 secured to the end of a shaft 304 and connected by a link 306 with an arm 308 secured to one end of a rock shaft 310, the other end of which is connected with the shaft 298 by beveled segments 312. The shaft 304 is driven through a pulley 314 mounted on the end of the shaft, and connected by a belt 316 with a pulley 318 formed on the hub of a loose pulley 320 forming a part of the driving mechanism of the machine which will be hereinafter described.

It is desirable that the means for supplying the buttons to the button chute should not operate to rub and agitate the buttons when the chute is full, or when a supply of additional buttons to the chute is unnecessary. Means is accordingly provided for controlling the operation of the button supplying means from the buttons in the chute. In the construction shown this means comprises a clutch mechanism interposed between the pulley 314 and the shaft 304 which is controlled from the buttons in the chute, and operates to automatically connect or disconnect the pulley and shaft in accordance with the supply of buttons in the chute. As shown, the pulley 314 is loosely mounted on the end of the shaft, and is provided with a flange 322 surrounding a collar 324 secured to the shaft. The collar 324 is provided with a flattened surface 326, and a roll 328 is interposed between this surface and the inner surface of the flange 322 to form a Horton clutch for connecting and disconnecting the pulley and shaft, (Figs. 4 and 7). The roll is held between the fingers 330 of the controller collar 332 which is provided with the usual projecting stop lug 334, and is connected with the collar 324 by a spring 336. The means for arresting and releasing the controlling collar 332 comprises a lever 338 carrying a plate 340 which is connected with the lever by a pin and slot connection 342, and is held yieldingly in the position indicated in Fig. 7 by a wire spring 344.

The position of the lever 338 and plate 340 in or out of the path of the lug 334 on the controlling collar is controlled by a feeler finger 346 pivoted at 348 on the bracket 300, and having its free end arranged to play through an opening in the back plate 234 of the feed chute, so that it will engage the buttons in the chute in case they cover the opening in the back plate. The feeling finger forms one arm of a bell crank lever, the other arm 350 of which is connected by a link 352 with an arm 354 secured to the rock shaft 356 which carries the arm 338. A spring 358 is connected to the link 352, and tends to project the feeler finger through the opening in the back plate, and to raise the arm 338 and plate 340 carried thereby out of the path of the lug 334 on the clutch controller collar. The arm 338 is depressed, and the feeler finger withdrawn from the button chute, by a cam 360 formed on the pulley 314, and engaging a roll on the end of the arm. If the buttons in the button chute do not overlie the end of the feeler finger, the cam 360 and spring 358 will depress and retract the arm 338 during each revolution of the pulley 314, and the clutch will continue to connect the pulley and shaft 304 so that buttons will be supplied to the button chute from the hopper. When the supply of buttons in the button chute is sufficient to cover the opening in the back plate through which the feeler finger plays, the buttons will prevent the retraction of the arm 338 after it has been depressed by the cam 360, and the plate 340 on the arm will engage the lug 334 and thus disengage the clutch and arrest the rotation of the shaft 304 and the operation of the button supplying mechanism in the hopper. Whenever the supply of buttons in the button chute is so far exhausted that the opening through which the feeler finger plays is uncovered, the arm 338 will be again retracted and will release the clutch controlling collar, thus again starting the operation of the button supplying mechanism in the hopper. Should the lug 334 underlie the plate 340 when the arm 338 is depressed by the cam 360, the plate will yield until the lug has passed, and will then return to position to engage the lug and stop the controller collar. The mechanism for delivering buttons from the hopper to the button chute is thus automatically controlled by the buttons in the button chute.

In order that the button chute and hopper may be readily removed and replaced, as occasion requires, the back plate 234 and its extension 278, which form the base plate for the chute and hopper, are connected with the supporting bracket 300 and a supporting bracket 362 near the lower end of the chute, by readily detachable connections. In the construction shown, the back plate 234 is provided near its lower end with a pin 364 arranged to engage a hole in the bracket 362, and the plate 278 is provided with a pin 366 adapted to pass through a hole in one arm of the bracket 300 (Figs. 1, 3 and 6). The lower end of the pin 366 is provided with a transverse groove adapted to be engaged by a wedge-shaped locking plate 368 formed on a pivoted arm 370. The arm 370 may be readily swung about its pivot to release the pin 366, and thus allow the hopper and chute to be removed. When the hopper and chute are replaced in position, the locking plate may be engaged with the pin 366 to firmly lock the chute and hopper in position.

The means for feeding the work between successive button securing operations to properly space the buttons comprises a feed point 372 which is given a 4-motion movement to engage one of the needle holes of the attached button, and to advance the work the required distance (Figs. 2, 6, 36 and 37). The feed point is secured in the upper end of a feed point slide 374 mounted to reciprocate vertically in an oscillating feed arm 376. The feed arm is pivotally mounted at its lower end upon the rock shaft 148, and is connected by a link 378 to an actuating lever 380. One end of the link is pivoted to the feed arm, and the other end is pivoted to a block 382 mounted to slide in a curved guideway 384 formed in one arm of the actuating lever. The curvature of the guideway is such that the feed point will be returned to the same initial position whatever the adjustment of the block 382, but will be advanced during its feeding stroke varying distances depending upon the adjustment of the block in the guideway. The means for adjusting the block in the guideway to vary the spacing of the buttons comprises a lever 386 pivoted at 388 to a fixed part of the machine frame, and having one end connected by a link 390 to the link 378. The other end of the adjusting lever 386 is provided with a gear segment 392 engaged by a pinion 394 secured to a short shaft 396. As shown in Figs. 2 and 6, the shaft 396 is mounted in the fixed end plate of the machine, and is provided on its outer end with an operating head 398 which is within convenient reach of the operator, and may be turned to adjust the spacing of the buttons. The movement of the adjusting head in either direction is limited by a stop pin 400 which projects into a slot 402 formed in a flange on the head. The shaft is frictionally held in adjusted position by a split sleeve 404, the frictional engagement of which with the shaft, may be regulated by an adjusting screw 406. The flange of the operating head may be provided with a scale to indicate the adjustment for various classes of work. The actuating lever 380 is reciprocated by a cam groove formed in the cam disk 36, and engaging a roll mounted on the end of the lever (Figs. 2 and 11).

The means for raising and lowering the feed point slide to engage the feed point with and disengage it from the work comprises a lever 408 carrying a roll engaging a cam 410 on the end of the cam shaft 12, and having its free end connected by a link 412 with the lower end of the feed point slide. A spring 414 is connected to the feed point slide, and tends to retract the slide and hold the roll on the lever 408 in engagement with the cam 410. The link 412 is so arranged with relation to the pivotal axis of the feed arm, and its length is so proportioned with relation to the distance between this axis and the feed point that the feed point is caused to travel in a substantially horizontal line during its feeding stroke, and is thus maintained in effective engagement with the work.

In doing certain classes of work it is desirable that the operator not only be able to readily adjust the feed mechanism in accordance with the desired spacing of the buttons, but also to modify this spacing at will during the operation of the machine. In Figs. 36, 37 and 38 a modification of the feeding mechanism shown in the other views is illustrated which enables this result to be accomplished. As shown in these views, the shaft 396, by manipulation of which the operator sets the feed mechanism for the desired spacing of the buttons, instead of being mounted upon a fixed part of the machine, is mounted in the end of a lever 416 pivoted on the stud 388, which also forms the pivotal support for the adjusting lever 386. The other end of the lever 416 is pivotally connected to the upper end of a rod 418 mounted to slide vertically in a bearing in the machine frame, and held by a spring 420 in engagement with one end of a lever 422, which is pivoted at 424 to the base on which the machine casing is pivoted. The other end of the lever 422 is connected by a link 426 with an arm 428 projecting from a rock shaft 430. The lower end of the link 426 slides freely through a hole in the end of the arm 428, and is provided with a collar 432 adapted to engage the under side of the arm. The rock shaft 430 is held in normal position against a stop 434 by a comparatively heavy spring 436. The rock shaft also carries a depending arm 438, to which a knee plate 440 is adjustably secured. With the parts in normal position the spacing of the buttons will be that corresponding with the setting of the adjusting shaft 396. The operator may, however, at any time during the feeding of the work, or at any other period in the operation of the machine, increase the feeding action of the feed point by pressing on the knee plate 440, and thus through connections described depress the shaft 396 and thus increase the feeding stroke of the feed point. The connections between the knee plate and support for the shaft 396 above described also enable the machine casing to be swung up about its pivotal connections with the base, without requiring any manipulations of the connections. The connections will again be brought into proper relation when the machine frame is swung down into its normal position on the base.

The machine is provided with starting and stopping mechanism which will operate to automatically stop the machine at a predetermined point whenever the operator releases the controlling treadle. As shown in Figs. 1, 3, 5, 7 and 9, the cam shaft 12 is driven from a driving shaft 442 through gearing 444 which is so proportioned that the cam shaft makes one revolution for two revolutions of the driving shaft. The driving shaft is driven through a belt 446 adapted to be shifted between the tight and loose pulleys 448 and 320 in starting and stopping the machine. The tight pulley carries a pivoted dog 450 so arranged that it will grip the hub of the loose pulley when the belt is on the tight pulley and thus transmit motion to the loose pulley, and through it and the belt 316 previously described, will drive the mechanism for feeding the buttons from the button hopper during the operation of the machine. The dog is so arranged, however, that when the belt is on the loose pulley the hub of the pulley will slip freely by the dog, so that the pulley will rotate idly with relation to the driving shaft 442.

The means for shifting the belt to throw the driving mechanism into and out of operation comprises a belt shifter 452 formed on the end of a belt shipper bar 454 which is mounted to slide in bearings in the machine casing, and is connected by means to be described with the devices for stopping the machine in a predetermined position.

The means for stopping the machine in a predetermined position comprises a stop plunger 456 provided with a wedge shaped end adapted to enter a corresponding notch 458 formed in a stop collar 460 which is secured to the driving shaft 442. The plunger 456 is mounted to slide in a cylindrical bearing formed in a block 462 which is secured to the end of a shifter rod 464. The stop plunger is forced forward in its bearing by a spring 466 interposed between a collar on the plunger and an adjusting plug 468 screwed into the end of the bearing. The shifter rod 464 is forced in a direction to bring the stop plunger into register with the stop collar on the driving shaft by a spring 470 which is interposed between one of the bearings for the rod and a collar 472 pinned to the rod. The block 462 is supported and guided by a lug 473 which projects from the machine casing and underlies a projecting lug 474 on the block. The lugs are held in engagement by a plunger 476 mounted in a bearing in the block 462, and forced against the under side of a lug 478 by a spring 480 interposed between a collar on the plunger and an adjusting plug 482 screwed into the lower end of the bearing.

The shifter rod and stop plunger carried thereby is retracted to withdraw the plunger from engagement with the stop collar by a bell crank lever 484 pivoted on the base of the machine, and having its upper end arranged to lie between a shoulder 486 on the shifter rod and an opposed latch 488 pivoted on the rod. The other arm of the bell crank lever is connected by a link 490 with the controlling treadle. The bell crank lever is held in position to bring the stop plunger into register with the stop collar on the driving shaft by a spring 492.

The belt shifter bar 454 is connected with the shifter rod 464 of the stop mechanism by a latch 494 pivoted on the bar, and having a laterally projecting end arranged to enter a notch formed in the collar 472. The latch thus normally connects the belt shipper bar with the shifter rod 464, so that the belt is shifted on to the tight pulley when the stop plunger is disengaged from the stop collar on the driving shaft, and is shifted on to the loose pulley when the stop plunger is moved into register with the stop collar and into position to stop the machine. When the stop plunger is moved into position to engage the stop collar, the end of the plunger rides against the cam shaped surface of the stop collar until the notch in the collar registers with the end of the plunger, when the plunger springs forward into the notch, thus arresting and locking the driving shaft in fixed position. The blow upon the plunger incident to arresting the machine is cushioned by the spring 480 which yields to allow the block 462 to move upward slightly, after which the recoil of the spring returns the plunger and driving shaft to stopping position.

Since the driving shaft makes two revolutions for each revolution of the cam shaft, and consequently two revolutions for each cycle of the machine, a timing cam 493 is secured to the cam shaft in position to engage a roll 495 on the block 462 and control the movement of the belt shifting and stopping devices when released by the operator. The timing cam is shaped to allow the belt shipper and stop plunger to be moved to stop the machine only during every second revolution of the driving shaft.

In order that the stopping devices may be conveniently thrown out of operation without shifting the belt on to the driving pulley in case it is desired to turn the driving shaft by hand, means is provided within convenient reach of the operator for disengaging the latch 494 which couples the belt shifter and stopping devices together. As shown, this means comprises a rod 496 mounted in the front side of the machine casing, and having its rear end connected by a link 498 with the latch 494. The end of the rod projects through the front side of the casing, and is provided with a head 500 which normally rests against the face of the casing. The head is provided with a projection 502 which normally enters a recess in the casing, and the pin and latch are held yieldingly in normal position by a spring 504. When it is desired to disconnect the belt shifter and stopping devices, the rod 496 is drawn forward, and the head 500 is turned until the lug 502 is in position to engage the face of the machine casing. This withdraws the latch 494, and the latch is held in withdrawn position by the lug 502. This movement of the latch brings a hook 508 formed on the latch into register with a locking lug 510, so that accidental movement of the belt shifter is prevented until the latch is returned to normal position and re-connects the belt shipper and stop devices.

The means shown for connecting the belt shifter and stopping devices with the controlling treadle permits the machine casing to be readily turned up about its pivotal supports, as indicated in Fig. 5, and insures the proper reëngagement of the parts with the treadle mechanism when the casing is returned to normal position. In case the treadle should be depressed when the casing is swung down into normal position, the latch 488 will strike the upper end of the bell crank lever 484, and will be lifted sufficiently to enable the casing to return to normal position. When the treadle is released the bell crank lever will swing into normal position, and the latch 488 will drop down into position to coöperate with the end of the lever. To support the latch and retain it in proper position upon the shifter rod, it is provided with two bent wire stops 512 arranged to overlie and underlie the bar, the underlying stop being spaced sufficiently from the bar to allow the upward movement of the latch above described.

While it is preferred to employ the specific construction and arrangement of parts shown and described, it will be understood that this construction and arrangement is not essential to the broader features of the invention, and may be varied and modified as found desirable or best suited to the construction and arrangement of the parts of the machine in which any of such features are to be embodied.

The work feeding mechanism, the button feeding mechanism and the driving and stopping mechanism shown and described which are not claimed herein form the subject matter of applications Serial No. 87,475, filed March 29, 1916, Serial No. 90,573. filed April 12, 1916, and Serial No. 109,786, filed July 17, 1916.

Having explained the nature and object of the invention, and specifically described one form of machine in which it may be embodied, what is claimed is:—

1. A button sewing machine, having, in combination, a reciprocating needle for passing a primary loop through a button eye and a secondary loop through the primary loop outside of the eye, and a looper provided with fingers for taking the loops and having a reciprocatory movement to carry the fingers across the path of reciprocation of the needle in paths approximately parallel to the work.

2. A button sewing machine, having, in combination, a reciprocating needle for passing a primary loop through a button eye and a secondary loop through the primary loop outside of the eye, and a reciprocating looper arm provided with two loop taking fingers in fixed position thereon for taking the primary and secondary loops from the needle.

3. A button sewing machine, having, in combination, a reciprocating needle for passing a primary loop through a button eye and a secondary loop through the primary loop outside of the eye, a reciprocating looper arm provided with two loop taking fingers in fixed position thereon for taking the primary and secondary loops from the needle, and means for carrying the secondary loop over the button.

4. A button sewing machine, having, in combination, a reciprocating needle for passing a primary loop through a button eye and a secondary loop through the primary loop outside of the eye, a looper provided with loop taking fingers, and means for reciprocating the looper to carry the loop taking fingers in parallel paths across the path of reciprocation of the needle to take the primary and secondary loops from the needle.

5. A button sewing machine, having, in combination, a reciprocating needle for passing a primary loop through a button eye and a secondary loop through the primary loop outside of the eye, a reciprocating looper provided with loop taking fingers moving in the line of feed in paths approximately parallel to the work to take the primary and secondary loops from the needle, and means for moving the looper transversely of the line of feed.

6. A button sewing machine, having, in combination, a reciprocating needle for passing a primary loop through a button eye and a secondary loop through the primary loop outside of the eye, and a looper arm mounted to oscillate about a fixed axis and provided with oppositely projecting loop taking fingers in fixed position for taking the primary and secondary loops from the needle.

7. A button sewing machine, having, in combination, a vertically reciprocating needle for passing a primary loop through a button eye and a secondary loop through the primary loop outside of the eye, a horizontal rock shaft, a looper arm secured to the rock shaft, looper fingers in fixed position on the arm for taking the primary and secondary loops from the needle, and mechanism for rocking the shaft and moving it axially.

8. A button sewing machine, having, in combination, a reciprocating needle for passing a primary loop through a button eye and a secondary loop through the primary loop outside of the eye, and a reciprocating looper arm provided with loop taking fingers projecting toward each other to take the primary and secondary loops.

9. A button sewing machine, having, in combination, a reciprocating needle for passing a primary loop through a button eye and a secondary loop through the primary loop outside of the eye, and a reciprocating looper arm provided with loop taking fingers projecting toward each other and arranged one above the other.

10. A button sewing machine, having, in combination, a reciprocating needle for passing a primary loop through a button eye and a secondary loop through the primary loop outside of the eye, a reciprocating looper for taking the primary and secondary loops from the needle, a spreader for spreading the secondary loop, and a loop guide for guiding the secondary loop under the button shank.

11. A button sewing machine, having, in combination, mechanism for forming interlocking primary and secondary button attaching loops, a looper for holding the secondary loop in position to pass over the button head, and a reciprocating loop guiding plunger for guiding the loop under the button shank.

12. A button sewing machine, having, in combination, mechanism for passing a primary loop through a button eye and a secondary loop through the primary loop outside of the eye, and a reciprocating loop guiding plunger arranged to pass through the secondary loop and under the button head to guide the loop below the button shank.

13. A button sewing machine, having, in combination, mechanism for forming interlocking primary and secondary button attaching loops, a looper for holding the secondary loop in position to pass over the button head, a loop spreader, and a loop guiding plunger for guiding the loop under the button shank.

14. A button sewing machine, having, in combination, mechanism for forming interlocking primary and secondary button attaching loops, a looper for holding the secondary loop in position to pass over the button head, a coöperating spreader for spreading the loop, and a loop guide for directing the loop under the button shank.

15. A button sewing machine, having, in combination, mechanism for forming interlocking primary and secondary button attaching loops and holding the secondary loop in position to pass over the button head, a loop guiding plunger and means for thrusting the plunger through the loop and under the button head.

16. A button sewing machine, having, in combination, mechanism for forming interlocking primary and secondary button attaching loops and holding the secondary loop in position to pass over the button head, and a reciprocating loop guiding plunger for guiding the loop under the button shank provided with guiding slots for determining its path of reciprocation.

17. A button sewing machine, having, in combination, mechanism for forming interlocking primary and secondary button attaching loops, a looper for holding the secondary loop in position to pass over the button head, a loop spreading finger, means for moving the finger transversely of the line of feed to enter and spread the loop, a loop guide, and means for thrusting the guide through the loop and under the button head.

18. A button sewing machine, having, in combination, a reciprocating needle for passing a primary loop through a button eye and a secondary loop through the primary loop outside of the eye, means for passing the secondary loop over the button head, a thread clamp, and means for operating the clamp to clamp the thread during the first loop carrying stroke of the needle to tighten the attaching knot of the preceding button.

19. A button sewing machine, having, in combination, a reciprocating needle for passing a primary loop through a button eye and a secondary loop through the primary loop outside of the eye, means for passing the secondary loop over the button head, a thread clamp, a takeup, mechanism for operating the clamp to clamp the thread during the second loop carrying stroke of the needle, and mechanism for operating the takeup to take up thread during this stroke of the needle.

20. A button sewing machine, having, in combination, a reciprocating needle for passing a primary loop through a button eye and a secondary loop through the primary loop outside of the eye, means for passing the secondary loop over the button head, a cam operated takeup, an auxiliary spring takeup, and means for clamping the thread during a part of the first loop carrying stroke of the needle and during the action of the takeup.

21. A button sewing machine, having, in combination, an oscillating needle carrier, a reciprocating needle bar mounted in the carrier, and a reciprocating takeup also mounted in the carrier.

22. A button sewing machine, having, in combination, an oscillating needle carrier, a reciprocating needle bar mounted in the carrier, a reciprocating takeup mounted in the carrier, and an auxiliary spring takeup on the carrier between the reciprocating takeup and needle bar.

23. A button sewing machine, having, in combination, an oscillating needle carrier, a reciprocating needle bar mounted in the carrier, a reciprocating takeup mounted in the carrier, an auxiliary spring takeup on the carrier between the reciprocating takeup and needle bar, a guide on the needle bar through which the thread leads to the needle, and a guide on the carrier between the needle bar and auxiliary spring takeup.

24. A button sewing machine, having, in combination, button attaching mechanism, upper and under positioning plates with a shank receiving slot between them, a clamp for clamping the button against the plates, and means for raising the upper plate to permit the button to pass over the lower plate.

25. A button sewing machine, having, in combination, button attaching mechanism, upper and lower button positioning plates with a shank receiving slot between them having a closed end forming a stop for the button, a clamp for clamping the button against the plates, and means for raising the upper plate to permit the button to pass over the lower plate.

26. A button sewing machine, having, in combination, button attaching mechanism, upper and lower button positioning plates with a shank receiving slot between them, a shank receiving recess in the upper edge of the lower plate, a clamp for clamping the button against the plates, and means for raising the upper plate to permit the button to pass over the lower plate.

27. A button sewing machine, having, in combination, button attaching mechanism, upper and lower button positioning plates with a shank receiving slot between them, a clamp for clamping the button against the plates, means for raising and lowering the upper plate, and means for lifting the button over the lower plate.

28. A button sewing machine, having, in combination, button attaching mechanism, upper and lower button positioning plates with a shank receiving slot between them, a clamp for clamping the button against the plates, means for feeding buttons to the plates, a button lifter, mechanism for actuating the clamp to clamp and release the buttons, mechanism for raising and lowering the upper plate, and mechanism for actuating the lifter to lift the button over the lower plate.

29. A button sewing machine, having, in combination, button attaching mechanism, a button positioning plate against which the under side of the button head is clamped, and a clamping plate for engaging the top of the button head to clamp the head against the positioning plate having a central centering recess in its face.

30. A button sewing machine, having, in combination, button attaching mechanism, a button positioning plate having a shank supporting upper edge, a pivot clamp for clamping the button against the plate, a spring pressed slide for operating the clamp, a latch for holding the clamp retracted, and means for operating the latch and for retracting the slide.

31. A button sewing machine, having, in combination, button attaching mechanism, a lower positioning plate having a shank supporting upper edge, an upper plate, means for clamping the button against the plates, a button lifter, and a vertically swinging block on which the upper plate and lifter are mounted.

32. A button sewing machine, having, in combination, button attaching mechanism, a lower button positioning plate having a shank supporting upper edge, an upper plate, a lever carrying the upper plate, a vertically swinging block on which the lever is pivoted, and a pin and slot connection between the lever and a relatively stationary part.

33. A button sewing machine, having, in combination, button attaching mechanism, a lower button positioning plate having a shank supporting upper edge, an upper plate, a clamp for clamping the buttons against the plates, a button lifter, a vertically swinging block on which the upper plate, clamp and lifter are pivotally mounted, means for operating and for retracting the clamp, and relatively stationary abutments for operating the upper plate and lifter during the upward movement of the block.

34. A button sewing machine, having, in combination, button attaching mechanism, a button positioning plate having a shank supporting upper edge, a clamp for clamping the button against the plate, a vertically swinging block on which the clamp is pivoted, a pivoted button lifter carried by the block, a spring pressed slide on the block for operating the clamp, a latch for holding the clamp retracted, a lever for releasing the clamp when moved in one direction and for withdrawing the clamp and swinging the block to raise the upper plate and button lifter when moved in the opposite direction.

35. A button sewing machine, having, in combination, button attaching mechanism, a button positioning plate having a shank supporting upper edge, a button clamp, a button lifter, means for operating the clamp and lifter, and a reciprocating slide on which the plate, clamp and lifter are mounted.

36. A button sewing machine, having, in combination, a button positioning plate having a shank supporting upper edge, a vertically movable upper plate, a button clamp, a button lifter, means for operating the upper plate, clamp and lifter, and a reciprocating slide on which the plates, clamp and lifter are mounted.

37. A button sewing machine, having, in combination, button attaching mechanism, a lower button positioning plate having a shank supporting upper edge, an upper plate, a button clamp, a button lifter, a vertically swinging block on which the upper plate, clamp and lifter are pivoted, and a reciprocating slide on which the lower plate and block are mounted.

38. A button sewing machine, having, in combination, button attaching mechanism, a button chute having a shank guiding slot curved to deliver buttons with the shanks substantially horizontal, and a horizontally reciprocating carrier to which the buttons are delivered from the chute and by which they are carried to attaching position.

39. A button sewing machine, having, in combination, button attaching mechanism, a button chute on one side of the line of feed of the attached buttons, a button carrier, and mechanism for moving the carrier transversely of the line of feed between the end of the chute and the button attaching position.

40. A button sewing machine, having, in combination, button attaching mechanism, a button chute at one side of the line of feed of the attached buttons arranged to deliver the buttons with the shanks substantially horizontal, a horizontally reciprocating button carrier moving transversely of the line of feed for transferring the buttons from the end of the chute to attaching position.

41. A button sewing machine, having, in combination, button attaching mechanism, a button chute on one side of the line of feed of the attached buttons arranged to deliver the buttons with the shanks substantially horizontal, and a transversely reciprocating carrier having a button positioning plate to register with the delivery end of the chute and with the button attaching mechanism.

42. A button sewing machine, having, in combination, button attaching mechanism, a button chute having a shank guiding slot, a reciprocating carrier provided with a button positioning plate arranged to register with the shank slot of the chute at one end of its reciprocation and with the attaching mechanism at the other end of its reciprocation, means for feeding a button from the chute to the plate, a clamp for clamping the button against the plate, and means for lifting the button over the plate when the plate is in button attaching position.

43. A button sewing machine, having, in combination, a vertically reciprocating needle and coöperating devices for passing a primary loop through a button eye and a secondary loop through the primary loop outside of the eye and for passing the secondary loop over the head of the button, a button chute having a shank guiding slot and a transversely reciprocating carrier having a button positioning plate arranged to register with the slot at one end of its reciprocation and to present the button eye in the needle path at the other end of its reciprocation.

44. A button sewing machine, having, in combination, a vertically reciprocating needle and coöperating devices for passing a primary loop through a button eye and a secondary loop through the primary loop outside of the eye and for passing the secondary loop over the head of the button, a button chute having a shank guiding slot, a carrier having lower and upper button positioning plates with a shank receiving slot between them adapted to register with the slot in the chute, mechanism for moving the carrier transversely to the line of feed of the attached button to present the eye of the button in the needle path and for returning the carrier to the end of the chute, and means for raising the upper plate to permit the button to pass over the lower plate when the carrier is in attaching position.

45. A button sewing machine, having, in combination, a vertically reciprocating needle and coöperating devices for passing a primary loop through a button eye and a secondary loop through the primary loop outside of the eye and for passing the secondary loop over the head of the button, a button chute having a shank guiding slot, a carrier having lower and upper button positioning plates with a shank receiving slot between them adapted to register with the slot in the chute, a clamp on the carrier for clamping the button against the plates, mechanism for moving the carrier transversely to the line of feed of the attached buttons to present the eye of the button in the needle path and for returning the carrier to the end of the chute, means for operating the clamp, and means for raising the upper plate to permit the button to pass over the lower plate when the carrier is in button attaching position.

46. A button sewing machine, having, in combination, a vertically reciprocating needle and coöperating devices for passing a primary loop through a button eye and a secondary loop through the primary loop outside of the eye and for passing the secondary loop over the head of the button, a button chute having a shank guiding slot, a carrier having lower and upper button positioning plates with a shank receiving slot between them adapted to register with the slot in the chute, a clamp on the carrier for clamping the buttons against the plates, a button lifter on the carrier for lifting the buttons over the lower plate, mechanism for moving the carrier transversely to the line of feed of the attached buttons to present the eye of the button in the needle path and for returning the carrier to the end of the chute, and means for operating the clamp and lifter and for raising the upper plate.

WILLARD A. SMITH.